US011184858B2

(12) United States Patent
Daoura et al.

(10) Patent No.: US 11,184,858 B2
(45) Date of Patent: Nov. 23, 2021

(54) BLUECELL DEVICES AND METHODS

(71) Applicant: PB, Inc, Renton, WA (US)

(72) Inventors: Daniel J. Daoura, Renton, WA (US); Nicholas R. Pearson-Franks, Renton, WA (US)

(73) Assignee: PB, Inc., Issaquah, WA (US)

( * ) Notice: Subject to any disclaimer, the term of this patent is extended or adjusted under 35 U.S.C. 154(b) by 0 days.

(21) Appl. No.: 16/575,315

(22) Filed: Sep. 18, 2019

(65) Prior Publication Data

US 2020/0128482 A1 Apr. 23, 2020

Related U.S. Application Data

(60) Provisional application No. 62/732,945, filed on Sep. 18, 2018, provisional application No. 62/882,465, filed on Aug. 2, 2019.

(51) Int. Cl.
*G04B 29/00* (2006.01)
*H04W 52/02* (2009.01)
(Continued)

(52) U.S. Cl.
CPC ......... *H04W 52/028* (2013.01); *H04W 4/029* (2018.02); *H04W 4/80* (2018.02); *H04W 52/0229* (2013.01); *H04W 76/28* (2018.02)

(58) Field of Classification Search
CPC ...... H04B 1/1615; H04W 4/02; H04W 4/029; H04W 52/0241; H04W 52/0254; H04W 52/0274; H04W 64/00
(Continued)

(56) References Cited

U.S. PATENT DOCUMENTS 4,500,051 A 2/1985 Cottle, Jr. et al.
5,528,460 A 6/1996 Byrd
(Continued)

FOREIGN PATENT DOCUMENTS

GB 2389216 A 12/2003
WO 2011057287 A1 5/2011
(Continued)

OTHER PUBLICATIONS

US 9,144,735 B2, 09/2015, Nasiri et al. (withdrawn)
(Continued)

*Primary Examiner* — Joseph Arevalo
(74) *Attorney, Agent, or Firm* — Fogg & Powers, LLC

(57) ABSTRACT

Tracking devices having extended service life for use as finders, locators, sensors, and radio contact reporters. The devices combine a Bluetooth digital radioset and a cellular frequency modulation radioset and are operative with or without a smart device and with or without a cellular radio network. Finding, locating and sensing are provided as a Bluetooth network service, as a cellular network service, or as a service mediated on a network that combines Bluetooth and cellular radio nodes, with "Bluecell" devices acting as hubs. Bluecell devices can be authenticated on both Bluetooth and cellular networks. Systems and methods for using the dual radio devices are also disclosed. Power management schema made possible by dual radio control of on-board processing circuit function enable extended operation of Bluecell devices as part of an IoT. Remotely controllable devices having a service life of a year or more are described.

33 Claims, 21 Drawing Sheets

(51) Int. Cl.
*H04W 76/28* (2018.01)
*H04W 4/029* (2018.01)
*H04W 4/80* (2018.01)

(58) Field of Classification Search
USPC ........ 370/318, 328; 455/412.2, 127.5, 343.2, 455/414.1, 231
See application file for complete search history.

(56) References Cited

U.S. PATENT DOCUMENTS

| | | |
|---|---|---|
| 5,587,955 A | 12/1996 | Lee et al. |
| 5,610,596 A | 3/1997 | Petitclerc |
| 5,731,757 A | 3/1998 | Layson, Jr. |
| 5,963,130 A | 10/1999 | Schlager et al. |
| 5,973,599 A | 10/1999 | Nicholson et al. |
| 6,058,309 A | 5/2000 | Huang et al. |
| 6,297,737 B1 | 10/2001 | Irvin |
| 6,756,901 B2 | 6/2004 | Campman |
| 6,774,811 B2 | 8/2004 | Kaufman et al. |
| 6,847,892 B2 | 1/2005 | Zhou et al. |
| 7,034,684 B2 | 4/2006 | Boman et al. |
| 7,091,851 B2 | 8/2006 | Mason et al. |
| 7,114,175 B2 | 9/2006 | Lähteenmäki |
| 7,142,982 B2 | 11/2006 | Hickenlooper et al. |
| 7,180,500 B2 | 2/2007 | Marvit et al. |
| 7,218,944 B2 | 5/2007 | Cromer et al. |
| 7,274,295 B2 | 9/2007 | Koch et al. |
| 7,321,774 B1 | 1/2008 | Lau et al. |
| 7,418,257 B2 | 8/2008 | Kim |
| 7,420,465 B2 | 9/2008 | Ritter |
| 7,479,871 B2 | 1/2009 | Holowick |
| 7,502,619 B1 | 3/2009 | Katz |
| 7,551,930 B2 | 6/2009 | Lempiö et al. |
| 7,639,138 B2 | 12/2009 | Chang |
| 7,705,728 B2 | 4/2010 | Mock et al. |
| 7,768,393 B2 | 8/2010 | Nigam |
| 7,805,382 B2 | 9/2010 | Rosen et al. |
| 7,880,613 B1 | 2/2011 | Maeng |
| 7,924,141 B2 | 4/2011 | Tuttle |
| 7,929,951 B2 | 4/2011 | Stevens |
| 8,058,988 B1 | 11/2011 | Medina, III et al. |
| 8,063,789 B2 | 11/2011 | Kaufmann |
| 8,081,072 B2 | 12/2011 | Scalisi et al. |
| 8,094,011 B2 | 1/2012 | Faris et al. |
| 8,130,096 B2 | 3/2012 | Monte et al. |
| 8,144,015 B2 | 3/2012 | Burket et al. |
| 8,195,203 B1 | 6/2012 | Tseng |
| 8,280,351 B1 | 10/2012 | Ahmed et al. |
| 8,295,483 B2 | 10/2012 | Kageyama |
| 8,299,920 B2 | 10/2012 | Hamm et al. |
| 8,310,379 B2 | 11/2012 | Johnson |
| 8,328,092 B1 | 12/2012 | Robinson et al. |
| 8,385,883 B2 | 2/2013 | Rajan et al. |
| 8,395,968 B2 | 3/2013 | Vartanian et al. |
| 8,421,619 B2 | 4/2013 | Scalisi et al. |
| 8,427,969 B1 | 4/2013 | Juillard |
| 8,456,329 B1 | 6/2013 | Tran et al. |
| 8,502,900 B2 | 8/2013 | Fujino et al. |
| 8,506,524 B2 | 8/2013 | Gråskov et al. |
| 8,570,373 B2 | 10/2013 | Variyath et al. |
| 8,577,392 B1 | 11/2013 | Pai et al. |
| 8,604,925 B2 | 12/2013 | Monte et al. |
| 8,611,321 B2 | 12/2013 | Herrala et al. |
| 8,620,343 B1 | 12/2013 | Lau et al. |
| 8,620,841 B1 | 12/2013 | Filson et al. |
| 8,630,699 B2 | 1/2014 | Baker et al. |
| 8,633,817 B2 | 1/2014 | Khorashadi et al. |
| 8,665,784 B2 | 3/2014 | Kang et al. |
| 8,676,182 B2 | 3/2014 | Bell et al. |
| 8,761,804 B2 | 6/2014 | Johnson |
| 8,803,659 B2 | 8/2014 | Hill |
| 8,810,392 B1 | 8/2014 | Teller et al. |
| 8,812,028 B2 | 8/2014 | Yariv et al. |
| 8,839,386 B2 | 9/2014 | Gilboy |
| 8,862,378 B2 | 10/2014 | Curatolo et al. |
| 8,869,248 B2 | 10/2014 | Moosavi et al. |
| 8,989,096 B2 | 3/2015 | Chhabra et al. |
| 9,007,264 B2 | 4/2015 | Riley et al. |
| 9,024,749 B2 | 5/2015 | Ratajczyk |
| 9,043,433 B2 | 5/2015 | Backholm et al. |
| 9,113,300 B2 | 8/2015 | Marti et al. |
| 9,174,123 B2 | 11/2015 | Nasiri et al. |
| 9,195,866 B1 | 11/2015 | Mehranfar et al. |
| 9,196,139 B2 | 11/2015 | Gutierrez et al. |
| 9,253,752 B2 | 2/2016 | Lee et al. |
| 9,277,386 B1 | 3/2016 | Masiero et al. |
| 9,283,847 B2 | 3/2016 | Riley, Sr. et al. |
| 9,297,882 B1 | 3/2016 | Bhatia |
| 9,357,348 B2 | 5/2016 | Evans et al. |
| 9,392,404 B2 | 7/2016 | Daoura et al. |
| 9,392,405 B1 | 7/2016 | Auvenshine et al. |
| 9,407,624 B1* | 8/2016 | Myers .................. H04W 12/04 |
| 9,525,969 B2 | 12/2016 | Evans et al. |
| 9,525,970 B2 | 12/2016 | Farley et al. |
| 9,654,916 B2 | 5/2017 | de la Broise |
| 9,665,913 B2 | 5/2017 | Loutit |
| 9,685,066 B2 | 6/2017 | Vega et al. |
| 9,699,612 B2 | 7/2017 | Evans et al. |
| 9,710,821 B2 | 7/2017 | Heath |
| 9,794,898 B1 | 10/2017 | de Barros Chapiewski |
| 9,813,992 B2 | 11/2017 | Peinhardt et al. |
| 9,820,106 B2 | 11/2017 | Farley et al. |
| 9,889,305 B1* | 2/2018 | Hellman .............. A61N 1/3712 |
| 9,955,305 B2 | 4/2018 | Chapiewski et al. |
| 9,961,498 B2 | 5/2018 | Evans et al. |
| 9,965,941 B2 | 5/2018 | de Barros Chapiewski et al. |
| 9,989,626 B2 | 6/2018 | Sumiyoshi et al. |
| 10,008,097 B1 | 6/2018 | Kumar et al. |
| 10,021,516 B2 | 7/2018 | Farley et al. |
| 10,102,734 B2 | 10/2018 | Kumar et al. |
| 10,111,032 B2 | 10/2018 | Vega et al. |
| 2002/0070861 A1 | 6/2002 | Teller |
| 2002/0190861 A1 | 12/2002 | Wentworth |
| 2003/0047530 A1 | 3/2003 | Durbin |
| 2003/0095032 A1 | 5/2003 | Hoshino et al. |
| 2003/0210143 A1 | 11/2003 | Haddad |
| 2003/0235172 A1 | 12/2003 | Wood |
| 2004/0021569 A1 | 2/2004 | Lepkofker et al. |
| 2004/0174264 A1 | 9/2004 | Reisman et al. |
| 2004/0192352 A1 | 9/2004 | Vallstrom et al. |
| 2004/0198389 A1 | 10/2004 | Alcock et al. |
| 2005/0068172 A1 | 3/2005 | King |
| 2005/0134459 A1 | 6/2005 | Glick et al. |
| 2005/0139686 A1 | 6/2005 | Helmer et al. |
| 2005/0200478 A1 | 9/2005 | Koch et al. |
| 2006/0046709 A1 | 3/2006 | Krumm et al. |
| 2006/0158310 A1 | 7/2006 | Klatsmanyi et al. |
| 2006/0214855 A1 | 9/2006 | Harada et al. |
| 2006/0250255 A1 | 11/2006 | Flanagan |
| 2007/0070818 A1 | 3/2007 | Inomata et al. |
| 2007/0106775 A1 | 5/2007 | Wong |
| 2007/0167175 A1 | 7/2007 | Wong et al. |
| 2007/0194913 A1 | 8/2007 | Yokoshima et al. |
| 2007/0229350 A1 | 10/2007 | Scalisi et al. |
| 2007/0247307 A1 | 10/2007 | Riep |
| 2008/0001734 A1* | 1/2008 | Stilp .................. G08B 25/009 340/539.22 |
| 2008/0062120 A1 | 3/2008 | Wheeler et al. |
| 2008/0079581 A1 | 4/2008 | Price |
| 2008/0104649 A1 | 5/2008 | Naaman et al. |
| 2008/0143516 A1 | 6/2008 | Mock et al. |
| 2008/0172173 A1 | 7/2008 | Chang et al. |
| 2008/0174425 A1 | 7/2008 | Torning |
| 2008/0287143 A1 | 11/2008 | Banks et al. |
| 2009/0002188 A1 | 1/2009 | Greenberg |
| 2009/0058663 A1 | 3/2009 | Joshi et al. |
| 2009/0121930 A1 | 5/2009 | Bennett et al. |
| 2009/0143078 A1* | 6/2009 | Tu .......................... G01S 5/0252 455/456.3 |
| 2010/0080175 A1 | 4/2010 | Kang et al. |
| 2010/0130167 A1 | 5/2010 | Bennett et al. |
| 2010/0164715 A1 | 7/2010 | Buller et al. |
| 2010/0178913 A1 | 7/2010 | Herbert et al. |

(56) References Cited

U.S. PATENT DOCUMENTS

| | | |
|---|---|---|
| 2010/0273452 A1 | 10/2010 | Rajann et al. |
| 2010/0283600 A1 | 11/2010 | Herbert et al. |
| 2011/0074587 A1 | 3/2011 | Hamm et al. |
| 2011/0140884 A1 | 6/2011 | Santiago et al. |
| 2011/0177790 A1 | 7/2011 | Monte et al. |
| 2011/0254760 A1 | 10/2011 | Lloyd et al. |
| 2011/0263331 A1 | 10/2011 | Koski et al. |
| 2012/0007713 A1 | 1/2012 | Nasiri et al. |
| 2012/0052870 A1 | 3/2012 | Habicher |
| 2012/0086574 A1 | 4/2012 | Blumel et al. |
| 2012/0122480 A1 | 5/2012 | Scalisi et al. |
| 2012/0154115 A1 | 6/2012 | Herrala |
| 2012/0186312 A1 | 7/2012 | Lowder et al. |
| 2012/0309408 A1 | 12/2012 | Marti et al. |
| 2012/0309422 A1 | 12/2012 | Lewis-Evans et al. |
| 2012/0322380 A1 | 12/2012 | Nannarone et al. |
| 2013/0002481 A1 | 1/2013 | Solomon |
| 2013/0069782 A1 | 3/2013 | Duggal et al. |
| 2013/0072223 A1* | 3/2013 | Berenberg .......... G06F 16/9537 455/456.1 |
| 2013/0103606 A1 | 4/2013 | Holliday |
| 2013/0109427 A1 | 5/2013 | Matus |
| 2013/0150028 A1* | 6/2013 | Akins .................... H04W 4/021 455/427 |
| 2013/0159350 A1 | 6/2013 | Sankar et al. |
| 2013/0159825 A1 | 6/2013 | Nishio et al. |
| 2013/0166198 A1 | 6/2013 | Funk et al. |
| 2013/0179110 A1 | 7/2013 | Lee |
| 2013/0210360 A1 | 8/2013 | Ljung et al. |
| 2013/0214926 A1 | 8/2013 | Huang |
| 2013/0274587 A1 | 10/2013 | Coza et al. |
| 2013/0274954 A1 | 10/2013 | Jordan, Jr. et al. |
| 2014/0031895 A1 | 1/2014 | Rahimi et al. |
| 2014/0049376 A1 | 2/2014 | Ng |
| 2014/0062695 A1 | 3/2014 | Rosen et al. |
| 2014/0073262 A1 | 3/2014 | Gutierrez et al. |
| 2014/0085089 A1 | 3/2014 | Rasband et al. |
| 2014/0099921 A1 | 4/2014 | Weiss |
| 2014/0135042 A1 | 5/2014 | Buchheim et al. |
| 2014/0162693 A1 | 6/2014 | Wachter et al. |
| 2014/0213301 A1 | 7/2014 | Evans et al. |
| 2014/0228783 A1 | 8/2014 | Kraft |
| 2014/0274135 A1 | 9/2014 | Edge et al. |
| 2014/0274136 A1 | 9/2014 | Edge et al. |
| 2014/0279435 A1 | 9/2014 | Holman et al. |
| 2014/0297900 A1 | 10/2014 | Herbert et al. |
| 2014/0324585 A1 | 10/2014 | Mederos |
| 2014/0329460 A1 | 11/2014 | Loutit |
| 2014/0369695 A1 | 12/2014 | D'Andrade et al. |
| 2014/0378066 A1 | 12/2014 | Liu et al. |
| 2015/0005011 A1 | 1/2015 | Nehrenz et al. |
| 2015/0057518 A1 | 2/2015 | Lebel et al. |
| 2015/0099472 A1 | 4/2015 | Ickovic |
| 2015/0112264 A1 | 4/2015 | Kamen et al. |
| 2015/0168173 A1 | 6/2015 | Lewis-Evans et al. |
| 2015/0235120 A1 | 8/2015 | Warren |
| 2015/0296477 A1 | 10/2015 | Pan et al. |
| 2015/0356848 A1 | 12/2015 | Hatch |
| 2015/0371215 A1 | 12/2015 | Zhou et al. |
| 2015/0371511 A1* | 12/2015 | Miller ................ G06Q 10/0833 340/545.6 |
| 2016/0054083 A1* | 2/2016 | Kiyani .................... F41A 17/06 42/70.11 |
| 2016/0100368 A1 | 4/2016 | Sharma et al. |
| 2016/0171486 A1 | 6/2016 | Wagner et al. |
| 2016/0189450 A1* | 6/2016 | Anderson ........ G06K 19/07381 340/5.51 |
| 2016/0262082 A1 | 9/2016 | Flynn et al. |
| 2016/0335878 A1 | 11/2016 | Steven |
| 2016/0343032 A1 | 11/2016 | DeWitt et al. |
| 2017/0019755 A1 | 1/2017 | Thacher et al. |
| 2017/0019853 A1* | 1/2017 | Ghosh ................ H04W 52/0216 |
| 2017/0180062 A1* | 6/2017 | Johansen ............ H04W 76/27 |
| 2018/0260822 A1 | 9/2018 | Wells |
| 2018/0324562 A1* | 11/2018 | Park ........................ H04W 4/80 |
| 2019/0137947 A1* | 5/2019 | Yaghmour .............. G04G 17/06 |
| 2019/0182873 A1* | 6/2019 | Wass ...................... H04W 76/10 |
| 2019/0192053 A1 | 6/2019 | Saigh |
| 2019/0220715 A1 | 7/2019 | Park et al. |
| 2019/0296969 A1* | 9/2019 | Zimny .................. H04W 76/11 |
| 2019/0342833 A1* | 11/2019 | strom .................. H04W 68/005 |
| 2019/0394720 A1 | 12/2019 | McCoy et al. |
| 2020/0027096 A1 | 1/2020 | Cooner |
| 2020/0128212 A1* | 4/2020 | Sannala ................. H01Q 21/28 |
| 2020/0314752 A1* | 10/2020 | Haque ............... H04W 52/0216 |
| 2020/0337162 A1 | 10/2020 | Perkins et al. |
| 2020/0367147 A1* | 11/2020 | Hoglund ............... H04W 48/16 |
| 2020/0367471 A1 | 11/2020 | Deliou |
| 2021/0027309 A1 | 1/2021 | Wells |
| 2021/0035429 A1 | 2/2021 | Daoura et al. |

FOREIGN PATENT DOCUMENTS

| | | |
|---|---|---|
| WO | 2013188374 A2 | 12/2013 |
| WO | 2014042507 A1 | 3/2014 |

OTHER PUBLICATIONS

TrackR, 2014, Phone Halo Inc., 5 pages, [Online][Live Link Nov. 4, 2018] Retrieved from the Internet.

Boehret, "TrackR vs. Tile: The Lost-and-Found Face-Off", Recode, Apr. 1, 2018, p. 1 through 4, www.vox.com/2015/4/1/11560992/trackr-vs-tile-the-lost-and-found-face-off.

Frank, et al., "The Sensor Internet at Work: Locating Everyday Items Using Mobile Phones,", 2007, 26 pages.

Google, "Assisted GPS", at least as early as Dec. 1, 2020, p. 1 through 2, Google Search.

Google, "Universally unique identifier", at least as early as Nov. 30, 2020, p. 1 through 2, Google Search.

Haartsen, "Bluetooth—The universal radio interface for ad hoc, wireless connectivity", from No. 3, 1998 edition of Ericsson Review journal (8 pages).

IP.com, "Create Number List", InnovationQ Plus, at least as early as Dec. 1, 2020, p. 1 https://ip.ip.com/discover.

The Tile App—Item Finder for Anything, Photo, Facebook, Aug. 8, 2013.

Trackr, "Find lost keys, wallets, phones and more with TrackR pixel", at least as early as Sep. 15, 2020, pp. 1 through 7, https://secure.thetrackr.com.

U.S. Patent and Trademark Office, "Final Office Action", U.S. Appl. No. 14/301,236, dated Mar. 14, 2018, pp. 1 through 25, Published: US.

U.S. Patent and Trademark Office, "Final Office Action", U.S. Appl. No. 14/301,236, dated Oct. 21, 2016, pp. 1 through 23, Published: US.

U.S. Patent and Trademark Office, "Notice of Allowance", U.S. Appl. No. 14/301,236, dated Nov. 1, 2019, pp. 1 through 24, Published: US.

U.S. Patent and Trademark Office, "Notice of Allowance", U.S. Appl. No. 16/747,458, dated Dec. 28, 2020, pp. 1 through 30, Published: US.

U.S. Patent and Trademark Office, "Office Action", U.S. Appl. No. 14/301,236, dated Feb. 12, 2016, pp. 1 through 21, Published: US.

U.S. Patent and Trademark Office, "Office Action", U.S. Appl. No. 14/301,236, dated Mar. 8, 2019, pp. 1 through 46, Published: US.

U.S. Patent and Trademark Office, "Office Action", U.S. Appl. No. 14/301,236, dated Jul. 14, 2017, pp. 1 through 19, Published: US.

U.S. Patent and Trademark Office, "Office Action", U.S. Appl. No. 16/747,458, dated Apr. 17, 2020, pp. 1 through 13, Published: US.

VOS, "What is eDRX (Extended Discontinuous Reception)?", IoT Blog, Sierra Wireless, Jun. 4, 2020, pp. 1 through 7, https://www.sierrawireless.com/iot-blog/edrx-lpwa/.

WIPO, "edrx and bluetooth", Search International an National Patent Collections, at least as early as Dec. 1, 2020, pp. 1 through 2, https://patentscope.wipo.int/search/en/result.jsf?_vid=P12-KI655E-11650.

(56) References Cited

OTHER PUBLICATIONS

U.S. Patent and Trademark Office, "Office Action", U.S. Appl. No. 17/163,403, dated Jul. 9, 2021, pp. 1 through 24, Published: US.

* cited by examiner

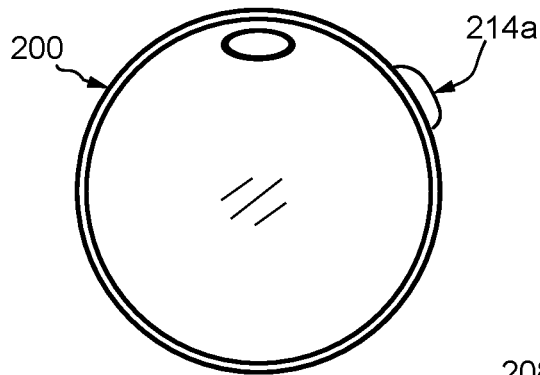
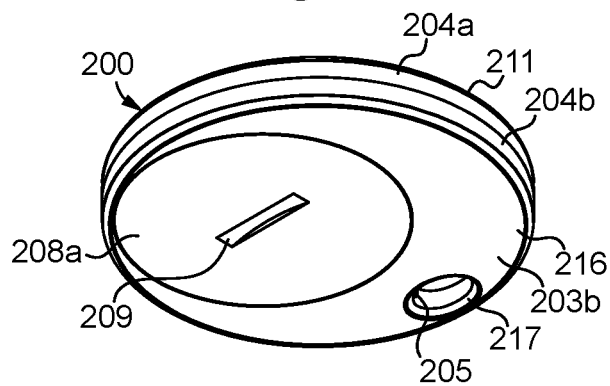
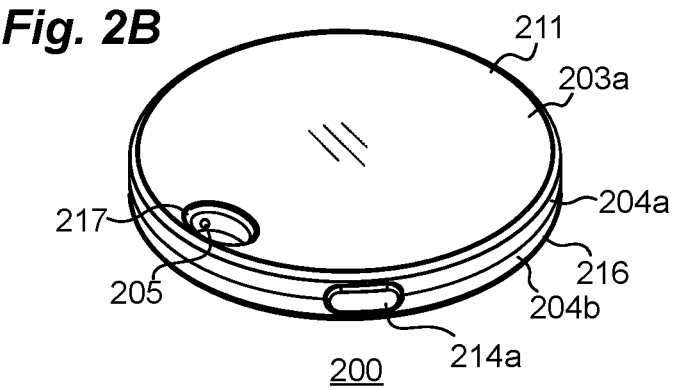
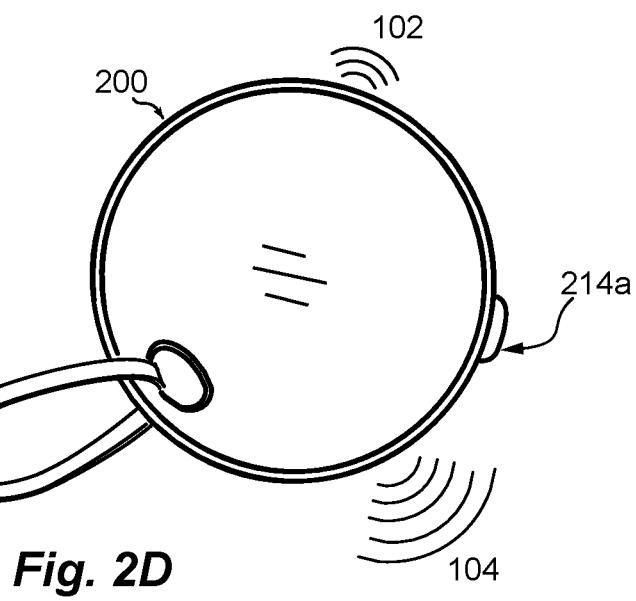

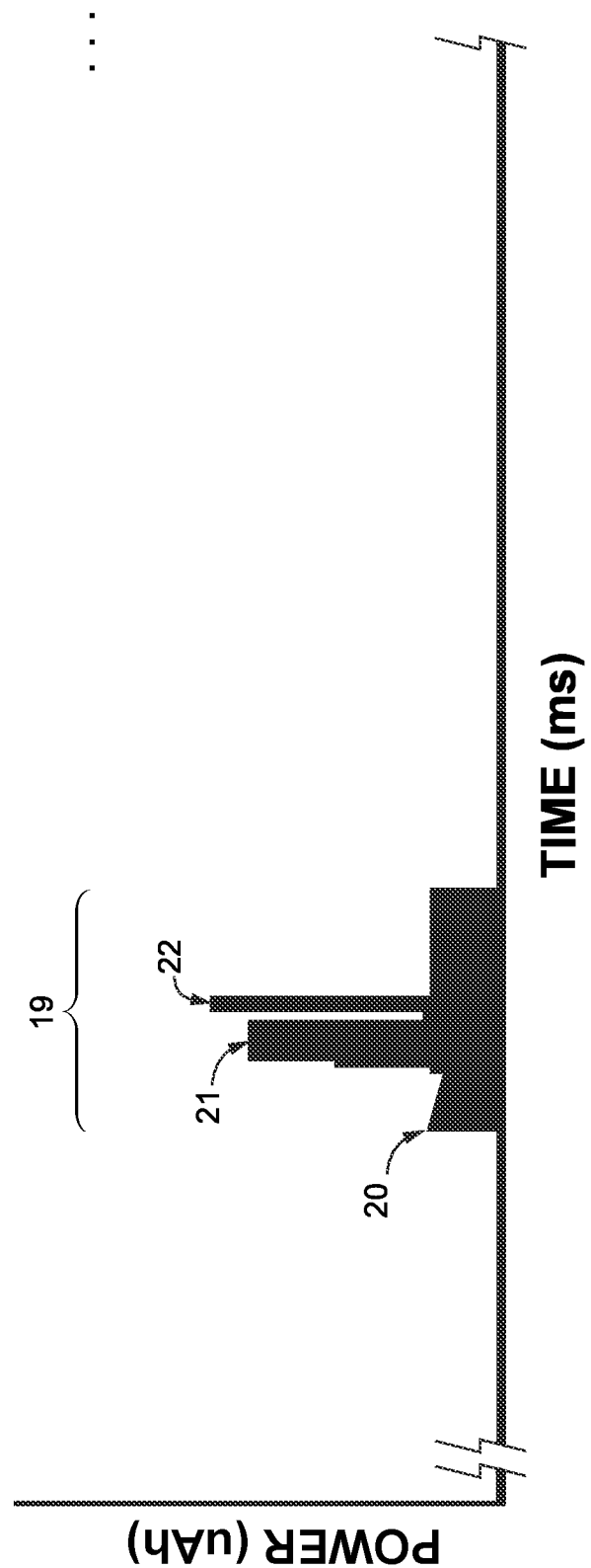

BLUECELL DEVICES AND METHODS

TECHNICAL FIELD

This disclosure pertains generally to tracking devices for IoT use having cellular and Bluetooth radiosets that coordinate power management for extended battery life.

BACKGROUND

The deployment of 5G radio networks is bringing increased complexity and variety to radio use. The backbone of the systems for most users is the cellular broadband network that supports voice and mixed media communications as well as data. Access to this system is tightly controlled by authenticating of users based on an IMSI encoded in the subscription identifier module that inserts into every cellular radio and sometimes also using the IMEI. The need for security comes at the cost of energy consumption, which limits the field life of detached IoT radios linked wirelessly to the cellular network.

In contrast, the Bluetooth radio standard is well suited for IoT applications because of its BTLE low energy specification and because the digital radio format permits open, spontaneous peer-to-peer connections in "scatternets" that promote promiscuous data exchange. A UUID is used to identify each Bluetooth radio, and the radios broadcast the UUID with the regularity of a beacon. Degeneracy in the identifier permit developers to encode a Bluetooth group identification inside the unique individual identifier so that a "smart device" such as a smartphone can receive random Bluetooth radio traffic from any Bluetooth device in radio proximity, and forward the traffic to an IP address associated with the Bluetooth group, often adding a timestamp or a location stamp to the message. By doing so, the smart device serves as a "hub" to transfer Bluetooth traffic from a local scatternet to the broader cellular network (or vice versa).

Bluecell radiotags may include sensors. Sensor data can be encoded and delivered to a cloud host in a Bluetooth radio transmission or in a cellular radio transmission. In one application, any detection by a smartphone of a Bluetooth identifier in ambient radio traffic triggers a search of records on the cloud, and if an object associated with a radiotag is lost, the resources of the cloud can be harnessed to locate or track the radiotag and associated object.

As an advantage in finding things, Bluetooth networks are based on proximity, and receiving a Bluetooth transmission is an indication that the radio is nearby. On the other hand, the range of a cellular radio is not limited by antenna power because once a signal is picked up by a cellular network, it can be carried around the world. As currently practiced, Bluetooth devices as part of the IoT (Internet of Things) rely on smartphones as hubs to upload data onto the global cellular network that we use for portable access to the cloud. The low powered Bluetooth device may last months or years on a single battery charge but the cellular smartphones we carry must be recharged on almost a daily basis. Advances in power management are needed if the Bluetooth device is to become its own hub, capable of connecting directly not only to its peers but also to the global cellular network—while maintaining a service life of months or years as a stand alone device.

SUMMARY

Bluecell devices are defined as having a Bluetooth radio transceiver with antenna, a cellular radio transceiver with antenna, and a processing circuit in a portable package with power management features programmable by dual wireless control. The devices are battery operated and may have a field service life greater than one year.

The processing circuit is enabled to cycle between a processing-circuit sleep mode and a processing-circuit awake mode in response to activity from the Bluetooth radio, the cellular radio, or from a sensor. A qualified radio signal addressed to either of the radios will wake the processing circuitry. The radio will then convey one or more commands to the processing circuit, and the commands can be executed while the circuit is in the processing-circuit awake mode. A qualified radio signal addressed to the Bluetooth radio contains a UUID transmitted in the open; a qualified radio signal addressed to the cellular radio is identifiable by a transmission in a paging window from a cellular network for which authentication has been made and access has been granted.

The cellular radio transceiver is configured to cycle between one of at least one cellular-radio sleep mode and a cellular-radio awake mode. The radio will transition from the cellular-radio sleep mode to a cellular-radio awake mode in response to receiving a cellular-radio wake request, will generate the first wake signal while operating in the cellular-radio awake mode and in response to the cellular-radio wake request, and will generate the first command signal while operating in the cellular-radio awake mode and in response to a cellular command.

The Bluetooth radio transceiver is configured to operate in one of at least one BT-radio sleep mode, will transition from the digital-radio sleep mode to a BT-radio awake mode in response to receiving a BT-radio wake request, will generate the second wake signal while operating in the BT-radio awake mode and in response to the digital-radio wake request, and will generate the second command signal while operating in the BT-radio awake mode and in response to a BT-radio command.

The term "Bluecell" is taken to indicate a low power solid state device having both a Bluetooth radio set and a cellular radio set that share a common operating system and processor with memory, sensor package, and user interface. The devices are small so as to be embedded, mobile, and attachable to things that people carry around, and hence are typically battery powered. Careful control of power consumption is part of any successful solution to the issues these applications pose. Surprisingly, the combination of Bluetooth and cellular radio offers a solution to both the problem of engineering for low power consumption while gaining the capacity to download and upload to and from cellular internet gateways in response to paging window signals, Bluetooth radio signals, and sensor data.

Also part of the invention is a software package or "App" that is installed on a smartphone and can be used to set up and program the dual-radio "bluecell" beacons for collecting sensor data, for effecting alerts and notifications, for reporting radio contact data, and for locating lost objects. The "Bluecell beacons" can cooperate with like devices in peer-to-peer networks or with other wireless devices in mesh networks and can access the large cellular networks that span the globe.

While the devices themselves are simple and limited in their energy budgets, there is a synergy in bridging two of the most commonly available networks on the planet in a single package. The devices bridge the Bluetooth network (operative with most of existing IoT devices) with the cellular network (operative with the ubiquitous smartphones and other smartphones that we carry).

Simple control functions are readily established. User/subscribers interacting with cloud hosts can manage many machine tasks ranging from turning on the coffee pot, closing the garage door, locking the locks, and mapping where the kids are after school.

The systems can also collect and aggregate data from thousands of subscribers in an area. By tapping into the power of Bluetooth and cellular networks to do positioning and proximity mapping, the tracking and finding of radiotagged objects becomes simple and doable from anywhere. The details of the devices, systems and methods for tracking and finding systems, and for messaging and data exchange are described in the figures and specification below.

It is to be expressly understood, however, that the drawings and examples are for illustration and description only and are not intended as a definition of the limits of the invention. The various elements, features, steps, and combinations thereof that characterize aspects of the invention are pointed out with particularity in the claims annexed to and forming part of this disclosure. The invention does not necessarily reside in any one of these aspects taken alone, but rather in the invention taken as a whole.

BRIEF DESCRIPTION OF THE FIGURES

The teachings of the present invention are more readily understood by considering the drawings, in which:

FIG. 2A is a sketch of an alternate tracking device with edge-positioned button switch.

FIGS. 2B and 2C illustrate top and bottom perspective views of the alternate tracking device. Shown are a battery access lid, button switch, and opening in the case for attaching the beacon to an item. FIG. 2D is a face view of the alternate beacon with keychain, button sensor, Bluetooth radioset and cellular radio set in a radiolucent housing.

FIG. 14 is a view of power management of a Bluetooth radioset.

GLOSSARY

Figure 1A:
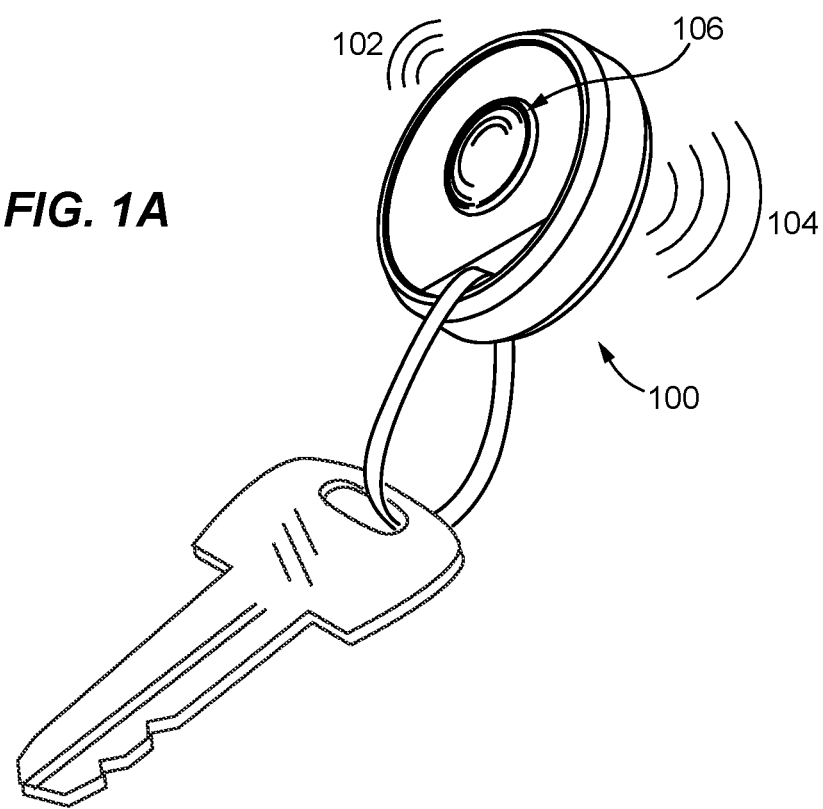
FIG. 1A is a sketch of a hybrid tracking device or "beacon" containing a Bluetooth and cellular radio pair (termed here a "Bluecell" "tracking device" or "radiotag") with keychain and center button.

Certain terms are used throughout the following description to refer to particular features, steps or components, and are used as terms of description and not of limitation. As one skilled in the art will appreciate, different persons may refer to the same feature, step or component by different names. Components, steps or features that differ in name but not in structure, function or action are considered equivalent and not distinguishable, and may be substituted herein without departure from the invention. The following definitions supplement those set forth elsewhere in this specification. Certain meanings are defined here as intended by the inventors, i.e., they are intrinsic meanings. Other words and phrases used herein take their meaning as consistent with usage as would be apparent to one skilled in the relevant arts. In case of conflict, the present specification, including definitions, will control.

"Bluecell beacon"—refers to a device having a low power Bluetooth radioset, generally a transceiver, for broadcasting a repeating but dynamic message, the message containing a unique identifier (conventionally termed a UUID) indicative of a device manufacturer, model and "serial number" to be associated with an owner, optionally a sub-identifier in the UUID associated with a Bluetooth group, optionally one or two frames or "values" (conventionally termed "major" and "minor" values) containing location or sub-type information, sensor output in digital form, and records of Bluetooth radio contacts, each with a UUID and optionally with a time stamp and a geostamp. "BT" relates to Bluetooth, as in BTLE for "Bluetooth Low Energy." TD is an abbreviation of "tracking device," referring to a Bluecell device that also incorporates a cellular radioset.

"Smart devices"—the most commonly recognized smart device is the ubiquitous cellphone or "smart device", what we will often term here a "handset" having a user/subscriber interface, a powerful battery, a cellular radioset, a highly advanced computational capacity, an operating system, memory for programs and "apps", typically a Bluetooth radioset, and commonly several sensors, all in a pocket-sized device. However, laptops, PDAs, Google glasses, smart wrist watches, and any generally portable device is commonly understood to be a "smart device" sensu lato. Smart devices are typically provided with a SIM card when used in cellular telephonic radio communications and each such device is given and IMSI Identification Number that serves to reference one particular device. The Bluecell devices disclosed here generally have both a UUID and an IMSI.

IMSI is an "international mobile subscriber identifier."
IMEI is an "international mobile equipment identifier."
UUID is a "universal unique identifier."
eDRX abbreviates "extended discontinuous reception."
PSM abbreviates "power savings mode."
VPG is a Virtual Private Gateway.

"Timestamp" is an automated function performed as a background service in most nodal devices. Each radio contact detected is assigned a record having a time and date.

"Geostamp" is an optional function performed as a background service in some nodal devices. Each radio contact is assigned a record having a datum indicative of proximity to a known location, or a GPS coordinate. Radio signal strength at a particular frequency is generally indicative of proximity. Cloud host servers may further refine location using aggregated data. But geostamping is a nodal device function, much as a camera associates an image in memory with a location determined by accessing GPS signals and making a calculation of latitude and longitude, generally on a dedicated chip included in the device for that purpose.

"Record making"—refers to creating and storing a record of a radio contact and/or at least one sensor datum in a memory module of a radiobeacon. The record may include a timestamp and a geostamp, or other contextual information, for example. Records in storage are generally retrievable, such as by accessing or searching a table or a database, or other computer-enabled data retrieval systems known in the art. Records may also be uploaded to a higher layer in a network, such as to a server or other cloud-based service.

"Sensor"—includes any device having a measurement function, either qualitative or quantitative, parametric or non-parametric. Sensors may measure physical properties such as temperature and output a digital signal to the processor indicative of the parameters of the physical properties. Sensors may be directed at measuring motion, velocity, impact, pressure, ambient or internal temperature, ambient light intensity, and so forth. The Bluecell devices of the system function as sensor tags that monitor and report local conditions to a higher level network. Once uploaded, aggregated sensor data may be used in generating a composite map of the local environment as has found application in "crowdsourced functions" such as weather mapping, traffic mapping, and hazard anticipation. Other sensors measure and report background noise level, particular sound patterns, radio traffic level, particular radio signals such as from Bluetooth beacons, and so forth. Sensors include photocells, radiation sensors, motion sensors, velocity sensors, accelerometers, jolt sensors, gyroscopic sensors, gesture sensors, gravitational sensors, magnetic sensors, compass sensors, clock sensors, switch open/closed sensors, vibration sensors, audio-pattern-detection sensors, vehicle-performance sensors, biological-agent sensors, biochemical-agent sensors, pollution sensors, chemical-agent sensors, temperature sensors, humidity sensors, windspeed sensors, pressure sensors, location sensors, proximity sensors, altitude sensors, smoke sensors, oxygen sensors, carbon-monoxide sensors, global-positioning-satellite sensors, relative-radio-signal-strength sensors, and radio-traffic sensors, for example. Sensors may be provided as packages having multiple sensors or individually. Sensors packages having audio sensors, such as a microphone or diaphragm, may include some level of acoustic-pattern-matching capability embedded in the sensor package. In some embodiments, a sensor is a combined 9-axis motion sensor and temperature sensor. In one preferred device, a sensor is an integrated package having an accelerometer, gyroscope, and magnetometer for each axis. In some instances, the sensor package is incorporated into a processor or an integrated circuit. Also contemplated are sensors for vibration, magnetic field, gravity, gases such as methane, CO, $CO_2$, NOX, CBD vehicle performance indicia, QR sensors, aerosol particulate levels, history of sub-zero temperature, history of product over-temperature, analytes such as chemical or biological substances, and the like. More generally some sensors can detect biological agents, biochemical agents, and/or chemical agents for example. Sensors also include radio devices designed to detect radio traffic, such as a "ping" from a proximate radio device. Such sensors may detect relative signal strength; other sensors may be GPS sensors having a function of reporting a location or location specification data, and may combine data such as by registering a radio contact, a time stamp and a location. Sensors may function as triggers when linked to an enabled device having instructions for receiving and acting on a sensor output, where the machine is linked to the sensor through a network having at least one node and at least one cloud host server. Self-reporting, such as reporting a low battery level, is also included in the scope of contextual data. Preferred sensors are miniaturized so that they may be co-housed with the radio controller and encoder module and sensor activity is controlled to reduce power draw.

"Remote machine"—may be what is termed here an "effector machine", indicating that the machine executes a physical transformation, such as a garage door opener, or what is termed here an "actuation device" more generally, indicating that the device may be a display for displaying content to a user/subscriber, or may be enabled to recruit other machines and devices to actuate performance of designated functions.

A "server" refers to a software engine or a computing machine on which that software engine runs, and provides a service or services to a client software program running on the same computer or on other computers distributed over a network. A client software program typically provides a user/subscriber interface and performs some or all of the processing on data or files received from the server, but the server typically maintains the data and files and processes the data requests. A "client-server model" divides processing between clients and servers, and refers to an architecture of the system that can be co-localized on a single computing machine or can be distributed throughout a network or a cloud.

"Processor" refers to a digital device that accepts information in digital form and manipulates it for a specific result based on a sequence of programmed instructions. Processors are used as parts of digital circuits generally including a clock, random access memory and non-volatile memory (containing programming instructions), and may interface with other digital devices or with analog devices through I/O ports, for example.

"Smartphone" is used in a broad sense to illustrate and convey inclusively the broad class of "smart devices" currently available. These include smart watches, tablets, PDAs, laptops, more generally the portable computing devices that provide cellular and Internet access on the go. These typically have Bluetooth connectivity. By installing what are called "applications" on a smart device, a developer can add functionality, and for example can supply an interactive display that permits the user/subscriber to navigate through and customize programmable features of a Bluetooth or Bluecell device that has been paired to the smart device. Also accessible using a smart device are web pages that may include administrative tools for navigating through, managing, and customizing programmable features of a Bluetooth or Bluecell device, and for selecting preferences, entering user information, updating or upgrading subscriptions to cloud services, and so forth. The smartphone need not be in a user's possession to be accessible by radio.

General connection terms including, but not limited to "connected", "attached," "conjoined," "secured," and "affixed" are not meant to be limiting, such that structures so "associated" may have more than one way of being associated. "Fluidly connected" indicates a connection for conveying a fluid therethrough. "Digitally connected" indicates a connection in which digital data may be conveyed therethrough. "Electrically connected" indicates a connection in which units of electrical charge are conveyed therethrough.

Relative terms should be construed as such. For example, the term "front" is meant to be relative to the term "back," the term "upper" is meant to be relative to the term "lower," the term "vertical" is meant to be relative to the term "horizontal," the term "top" is meant to be relative to the term "bottom," and the term "inside" is meant to be relative to the term "outside," and so forth. Unless specifically stated otherwise, the terms "first," "second," "third," and "fourth" are meant solely for purposes of designation and not for order or for limitation.

Reference to "one embodiment," "an embodiment," or an "aspect," means that a particular feature, structure, step, combination or characteristic described in connection with the embodiment or aspect is included in at least one realization of the present invention. Thus, the appearances of the phrases "in one embodiment" or "in an embodiment" in various places throughout this specification are not necessarily all referring to the same embodiment and may apply to multiple embodiments. Furthermore, particular features, structures, or characteristics of the embodiments may be combined in any suitable manner in one or more embodiments.

"Adapted to" includes and encompasses the meanings of "capable of" and additionally, "designed to", as applies to those uses intended by the patent. In contrast, a claim drafted with the limitation "capable of" also encompasses unintended uses and misuses of a functional element beyond those uses indicated in the disclosure, referencing Aspex Eyewear v Marchon Eyewear 672 F3d 1335, 1349 (Fed Circ 2012). "Configured to", as used here, is taken to indicate is able to, is designed to, and is intended to function in support of the inventive structures, and is thus more stringent than "enabled to" or "capable of".

It should be noted that the terms "may," "can," and "might" are used to indicate alternatives and optional features and only should be construed as a limitation if specifically included in the claims.

The various components, features, steps, or embodiments thereof are all "preferred" whether or not specifically so indicated. Claims not including a specific limitation should not be construed to include that limitation. For example, the term "a" or "an" as used in the claims does not exclude a plurality.

"Conventional" refers to a term or method designating that which is known and commonly understood in the technology to which this invention relates.

Unless the context requires otherwise, throughout the specification and claims that follow, the term "comprise" and variations thereof, such as, "comprises" and "comprising" are to be construed in an open, inclusive sense—as in "including, but not limited to."

The appended claims are not to be interpreted as including means-plus-function limitations, unless a given claim explicitly evokes the means-plus-function clause of 35 USC § 112 para (f) by using the phrase "means for" followed by a verb in gerund form.

A "method" as disclosed herein refers to one or more steps or actions for achieving the described end. Unless a specific order of steps or actions is required for proper operation of the embodiment, the order and/or use of specific steps and/or actions may be modified without departing from the scope of the present invention.

Also provided here are devices, software, networks, methods and system architectures for radiobeacon sensor payload sharing. These and other elements, features, steps, and advantages of the embodiments will be more readily understood upon consideration of the following detailed description, taken in conjunction with the accompanying drawings, in which embodiments as currently practiced are illustrated by way of example.

DETAILED DESCRIPTION

Bluecell devices function as finders, locators, sensors, and radio contact reporters. In a first embodiment, the devices may include a cellular radio transceiver with antenna and subscription identifier module, the cellular radio transceiver having a wake mode and at least one sleep mode; a digital radio transceiver with antenna and universal unique identifier, the digital radio transceiver having a wake mode and at least one sleep mode; a processor and processor support circuitry, the processor support circuitry comprising an alarm apparatus under control of the processor, the processor having a wake mode and at least one sleep mode; a power supply comprising a portable source of direct current; and, further characterized in that the cell radio transceiver, the digital radio transceiver, and the processor are operably linked to the support circuitry and power supply, are each and all configured to cycle to a sleep mode as a default condition, and the processor is configured to cycle to wake mode when one of the cellular radio transceiver or the digital radio transceiver detects a radio signal that carries one or more symbols or frames that satisfy the characteristics of a wake signal.

Figure 1B:
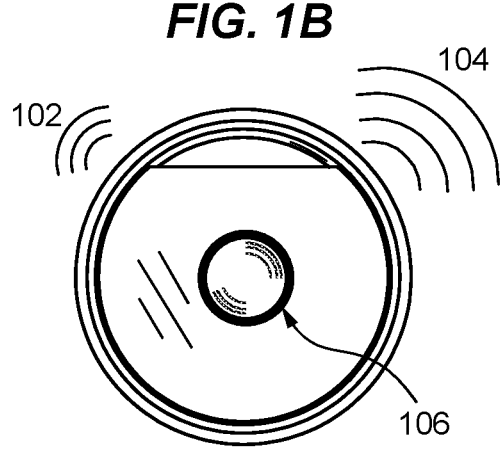
FIGS. 1B and 1C are frontal and perspective views a tracking device with center button.
Figure 1C:
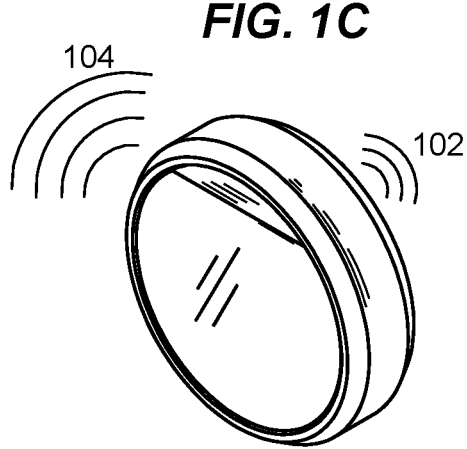

FIG. 1A is a sketch of a tracking device 100 or "beacon" containing a Bluetooth radio 102 and cellular radio 104 as a pair (termed here a "Bluecell" "tracking device" or "radiotag"), shown with keychain and center button 106. The devices are battery powered and are housed in a radiolucent case that can be attached to objects or persons in need of tracking or likely to get lost. FIGS. 1B and 1C are frontal and perspective views a tracking device with center button.

Bluecell mobile radio devices are characterized by a functional combination of radios: (A) A Bluetooth radio set having low power and a battery life of up to a year. The range of transmission at 0-5 dBm is up to or greater than 1000 ft under optimal conditions for radio signal propagation in which Bluetooth is unique because it does not use a carrier wave and the frequency hop cyclic is 1600 Hz. Generally, Bluecell operates at about 2.4 to 2.8 GHz, depending on nation-specific rules and shares the ISM band. The Bluetooth controller is able to selectively control layers of the Bluetooth device so as to optimize power saving while maintaining an "always listening" state that will catch any compatible radio traffic, get the UUID of the received signal, and can transmit a record of radio traffic, including the UUID and a time stamp for example, to a cloud host or store it in memory until a broadband radio channel to the cloud host opens up. The Bluetooth processor also can control the cellular radioset and may be used to multiplex the Bluecell and cellular radio broadcasts. (B) A cellular radioset is supplied with the Bluetooth radioset and the two work cooperatively to connect to the ad hoc local mesh networks characteristic of Bluetooth and the cellular basestations (eNodeB) characteristic of cellular telephone networks and as Internet portals. Using power management mediated with the assistance of the Bluetooth radioset, the service life of a battery powering the cellular radioset and Bluetooth radioset in a Bluecell device can be extended to many months, or even one year or more.

Synergy is immediately apparent in that location and sensor information can be uploaded directly to a cloud host via the cellular radioset (when powered on) and at all times shared with local networks of Bluetooth devices via the Bluetooth radio set.

When Bluetooth connectivity is good, and a companion handset operated by a user/subscriber is in radio proximity, the cellular module is generally put in SLEEP mode to save energy. The Bluetooth module operates to wake up the cellular module, either when a command is received by the Bluetooth processor, or according to a preset schedule programmed with the system clock. When AWAKE, the cellular radio can make and receive cellular traffic. The details of setup can be modified remotely using Bluetooth when routed through a smart device that is connected to the cloud, or when the cellular radio is AWAKE and receiving direct commands from a cellular radio source.

Logic conditions in which cellular is in SLEEP mode are those in which the Bluecell device is in a familiar location, such as at home or at an office, and not moving away from that location. When accelerometry and motion sensing indicate that the device is stationary, the processor may be set up to shut down the cellular module. In that circumstance, cellular wakes up to CALL HOME according to a regular schedule, the periodicity of which is selected by the user. A typical periodicity might be every 15 or 30 minutes when on the move. The Bluetooth processor can always wake up the cellular radio.

Similarly, if there is unexpected accelerometry and motion, the Bluecell processor can wake up and activate the cellular radioset. Another instance of a condition where the cellular radioset may turn itself on is on impact, such as a fall, a traffic accident, or when the device is dropped. These are all conditions that could be associated with the need to have greater connectivity to WAN and GAN networks, including Internet connectivity to a cloud host, and for that reason the processor can be configured to turn on the Cell radio for a CALL HOME event at least once following an impact. Other contextual information will be used by the cloud host and the user's handset to determine what if any added steps are appropriate.

In a "FIND PHONE" application, the device is configured with a switch that may be a mechanical switch or a haptic switch so that the user may press a button or wave the Bluecell device in order to activate a FIND ME display by the user's smart phone, when that is misplaced.

But more typically, the smart phone is configured to find the several Bluecell devices a user has deployed to keep track of things like keys, TV remotes, briefcases, wallets and other valuables. The Bluecell devices can also be used to keep track of children and pets, and one can be placed in a car so that the car can be found if the user is having a "senior moment" or is simply confused after a long day and doesn't remember where the car is parked.

The devices can also be configured so that any transit of a device outside a designated area will result in an alarm or a notification to a responsible party. This can be termed "geofencing" and is readily achieved with the very simple devices when used in combination with software installed on a smart device. Some functions are enhanced by the participation of a cloud host but in many cases, only the Bluecell tracking device and the mobile handset are needed.

Thus the system may include the Bluecell device, typically each Bluecell device has one or a package of sensors, a smart device or mobile hub configured with executable instructions for operating cooperatively with the Bluecell device, and also the system may include a cloud host. The cloud host may be useful in storing data and preferences, in looking up device identifiers, in making notifications across the Internet, in making long distance connections, and in aggregating large amounts of sensor data. With increasing use of machine intelligence, the sensor data in combination with geostamps and time stamps can be the source of valuable warnings and notifications addressed to particular user/subscribers or the community as a whole. The deployment of these devices by a community results in emergent properties of a system that cannot be predicted from the sum of the individual parts: Bluecell device, smart phone or mobile hub, cloud server.

Using an installable application, a smart device can control the Bluecell radiotags for their functions on a graphical user interface supported by the application. The cloud also is capable, with permission, to control the Bluecell radiotags. But the opposite is also true, the Bluecell radiotags can control functions of the smart devices such as taking a picture, responding to an email, sending a hug to a loved one, and indirect or direct control of remote machines, such as opening a garage door on the way home, starting the coffee pot from bed, turning off the alarm clock without getting up, and checking that all the doors in the house are closed and locked.

The application can support a dashboard for easy access to all the Bluecell devices operated by a user/subscriber, for quick adjustments to setup, and for viewing maps or plots of sensor data with trendlines and threshold monitoring that will result in automated actions taken by the system according to logic rules programmed by the user.

FIG. 2A is a sketch of an alternate tracking device 200 with edge-positioned button switch 214a. More detail is presented in FIG. 2B. The radiolucent case includes a top housing member 211 and a bottom housing member 216, each member defining a surface 203a, 203b and lateral lips 204a, 204b surrounding the center surface. An edge wall is formed where lips 204a, 204b on the top and bottom housing members meet. The lanyard hole 217 includes a hydrophobic vent 205 for equilibrating pressure while resisting water intrusion. The battery lid includes an O-ring seal (not shown in this view). These features are also shown in FIG. 2C, an underside perspective that shows the battery access door 208a with slot or detent 209 for use with screwdriver or coin when replacing the battery. FIG. 2D is a drawing of a keychain radiotagged with device 200 in an active state, depicting radio emissions from the Bluetooth radio core 102 and the cellular radio module 104. Typical Bluetooth radiosets use a BTLE radio transmission protocol (Bluetooth Low Energy), and hence are represented by radio airwaves (concentric arcs) that are smaller than the higher energy cellular radio airwaves (nested arcs).

Figure 3A:
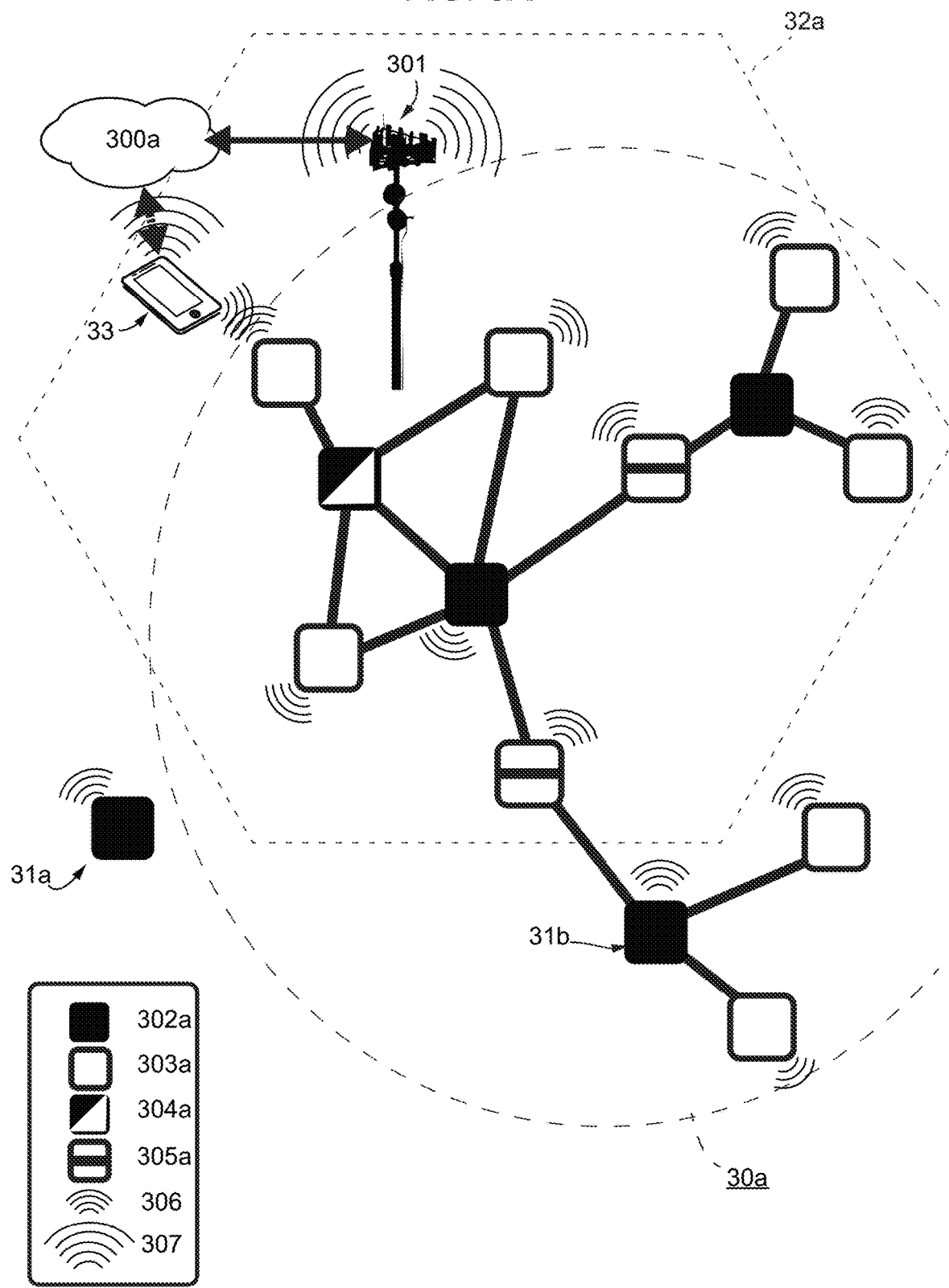
FIG. 3A is a view of a Bluetooth scatternet with dynamic mesh-type node topology and paired handset.

FIG. 3A is a view of a Bluetooth scatternet 30a with dynamic mesh-type node topology in which radio connections are represented by solid joining lines. Bluetooth is a true digital radio in which symbols are represented by strings of 1's and 0's at a transmission rate of 2.45 GHz.

With improvements in clock accuracy and reduced jitter, reception is achieved at separations of 1000 ft or more, sometimes approaching 1500 ft. A robust error check system enables very low energy transmissions. Vigorous frequency hopping is coordinated so as to reduce interferences from other radio sources in this part of the ISM band.

Device 31a is not proximate to other Bluetooth devices and hence is not part of a network. Device 31b is a master in a three-way network that is outside of and independent of the cell basestation 301 and its tracking area.

A key to the figure is provided. The symbols each represent a Bluetooth radio tracking device TD. The key is as follows: 302a "master" device/303a "slave" device/304a device that is master in one cluster and slave in another/305a device that is slave in two clusters/306 bluetooth low energy radio transmission/307 cellular radio transmission. Cell eNodeB towers (301, also termed "basestations") are also depicted with an accompanying hexagonal outline of a tracking area (dotted line). A smartphone (33, sometimes termed a handset or "smart device") is also shown and has both cellular and Bluetooth radio capacity.

The cloud is dependent on smartphone 33 to receive data from the Bluetooth scatternet. Similarly, the cellular network represented by cell tower 301 and "cell" 32a are not in direct communication with the Bluetooth scatternet.

In this figure, the TD Bluetooth radiosets cannot transmit or receive radio signals from the cellular radio towers 301, but will transmit data to an intermediary smartphone or other hub that in turn uploads the data onto the cloud 300a. Bluetooth devices that are not within radio range of a smartphone or other hub cannot share or receive data from the cloud, as has been a significant limitation for consumer acceptance of Bluetooth radio TDs.

What is implicit in this figure is that the Bluetooth connections can change dynamically each time a 0.625 ms "slot" opens up in a transmission stream. This promiscuity and peer-to-peer structure allows random network connections to be formed and broken without restriction and allows each net to merge with other nets. In contrast, the cellular network is a point-to-point network and requires authentication.

By definition, the first unit to initiate a radio cluster is the "master" and defines an access code (identifying the master), frequency hop regime (FH), and master clock for synchronization of radio contacts. Slave units synchronize by adding an offset to their native clock so that an absolute reference clock is not required. A header packet also includes a 3-bit slave identifier so that the master can address transmissions to individual slaves or broadcast en masse (point-to-multipoint). UUIDs (universally unique identifiers) assigned by the device manufacturer can also be used to identify individual devices, and are sufficiently unique that a global address book of devices can be implemented. In many instances the UUID also includes a shared community identifier. This may point to a manufacturer's URL or may designate membership in a group.

Frequency hopping serves to reduce interference in the low-energy Bluetooth radio traffic from higher energy transmissions such as local WiFi devices, microwaves, and so forth. The narrow band, fast moving hops, each with a nominal dwell time of 625 us, is coordinated by a BT master in each cluster, so that instantaneously only a small bandwidth (1 MHz) is occupied and most of the potential interference in the ISM band is avoided.

Bluetooth TDs have some capacity to determine location by mapping proximity to known locations, such as by RSSI relative to smartphones. In some instances, the location of a Bluetooth TD may be determined by proxy when it is in proximity to a handset 33 that can determine its own location by GPS, AGPS or AFLT, for example. GPS is generally not provided in Bluetooth TDs because of the limited battery capacity.

Proximate devices seek each other out and promiscuously configure themselves into networks without need for connection setup. What makes this relevant is that devices in SCAN and PAGE mode will detect a brief serendipitous burst transmission of compatible code in one of the 1600 frequency hops per second (0.625 milliseconds per slot), and synch up with the sending unit. The discovery process is one of trial and error. Bluetooth devices identify every Bluetooth radio signal they encounter by a UUID (universal unique identifier) in the broadcast and can be programmed to send a log of their radio contacts to a cloud host. The effect of this innovation is to turn a large community of Bluetooth users into a giant machine for finding lost Bluetooth radiotags.

Figure 3B:
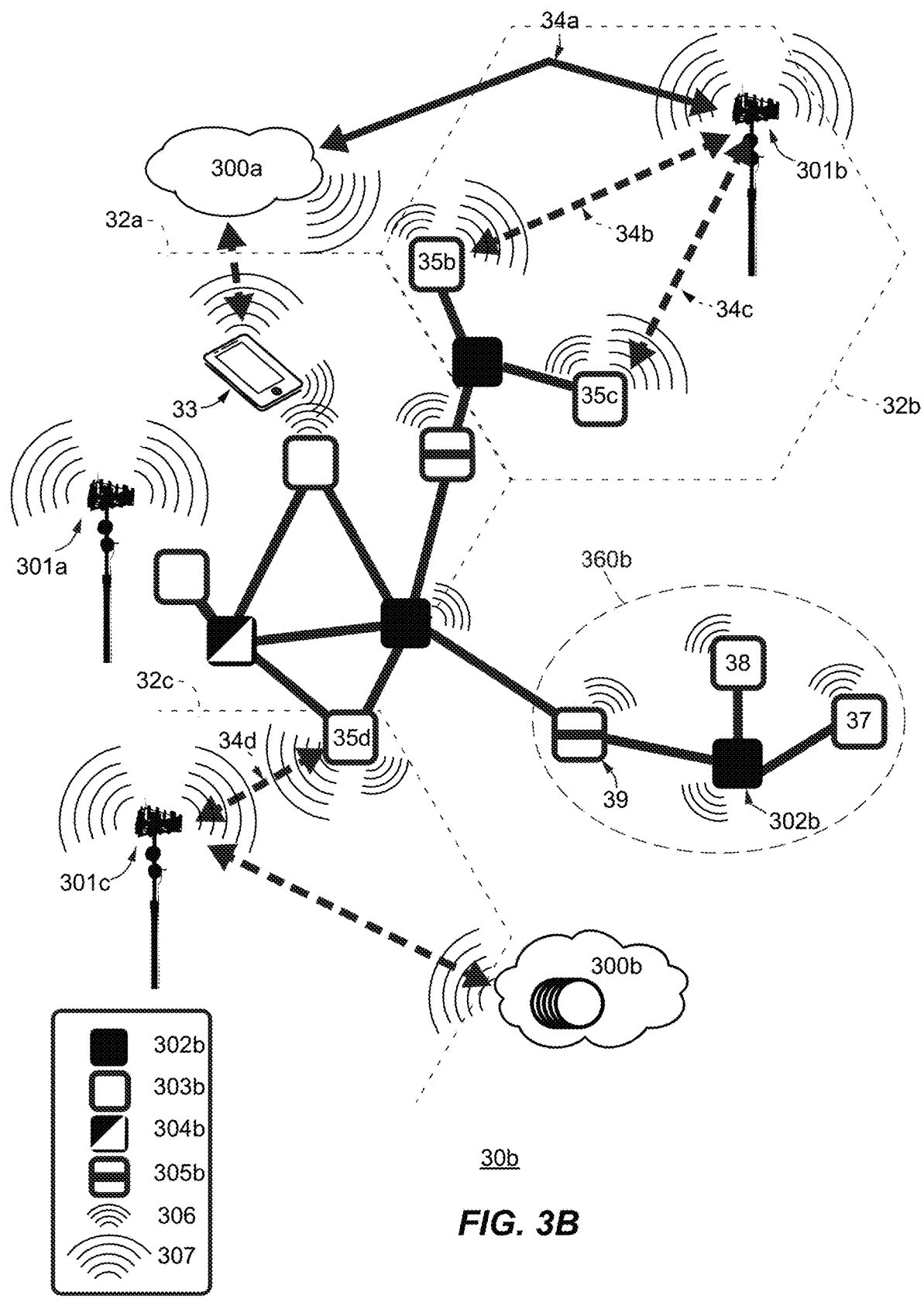
FIG. 3B shows a Bluecell hybrid wide area network and local ad hoc mesh network in which Bluetooth radio coverage is greater than cellular radio coverage.

FIG. 3B shows a Bluecell network 30b having a wide area cellular network intermeshed with a local ad hoc Bluetooth scatternet. The promiscuous features of the Bluetooth radio enable mesh networks for making peer-to-peer connections at a level of fine granularity that fills in between cell towers.

A key is provided for the figure. The symbols each represent a Bluecell radio tracking device TD. Bluecell TDs operating as Bluetooth radiosets are categorized by their standing in the mesh network. The key is as follows: 302b "master" Bluecell device/303b "slave" device/304b device that is master in one cluster and slave in another/305b device that is slave in two clusters/306 bluetooth low energy radio transmission/307 cellular radio transmission. Cell eNodeB towers (301a, 301b, 301c, also termed "basestations") are depicted with an accompanying hexagonal outline of a tracking area or "cell" (dotted line). The cloud host 300a can be linked to cell towers wirelessly or via optical fiber cables.

Three cellular "cells" are shown 32a, 32b, 32c, each with a cell tower 301a, 301b, 301c. Cell eNodeB towers (301a, 301b, 301c, also termed "basestations") are depicted with an accompanying hexagonal outline of a tracking area or "cell" (dotted line). The cloud host 300a can be linked to cell towers wirelessly or via optical fiber cables 34a.

Smartphone 33 has cloud access through the cellular network and also has a radio link to the mesh network, permitting data transfer. Even Bluecell devices 37, 38, 39 in an isolated cluster 360b can transfer data through other Bluecell devices to the smartphone. However, other Bluecell devices 35b, 35c, 35d have direct links 34b, 34c, 34d to the cellular towers and hence may be enabled to exchange packet data with the cloud 300a. For Bluecell devices, no intermediary smartphone is needed, although it remains an option. In a multicloud world, cloud host 300b may also connect to Bluecell transceiver 35d via cell tower 301c, and may collect, aggregate and analyze data from the mesh network. The cloud may provide access to databases and AI, administrative servers, distribution servers, cloud services such as position-over-LTE, and software services and features provided by cellular service providers, for example.

When active as a Bluetooth transmitter, the Bluetooth radios broadcast their UUID. When the cell radio of a Bluecell transmitter is active, the cellular modules are authenticated to a cellular network by their IMSI and/or IMEI. Both the Bluetooth radioset and the cellular radioset can transmit data from sensors and radio contact data logs. The radio contact data will generally include a timestamp and a geostamp. Sensor data may also include a timestamp and a geostamp and may be stored in on-board registers until uploaded or transmitted in real time. By operating TDs with the Bluetooth radioset in "always listening" standby mode, the devices can be configured to wake up when Bluetooth radio traffic is detected. A record of each Bluetooth radio contact can also be stored in an on-board register for later uploading to a network. Bluetooth traffic will power up the processor and the cellular radio.

The cellular radioset can be placed in "sleep" mode most of the time, but in one embodiment can be woken up by the Bluetooth core when needed. In another embodiment, cellular messages to a particular device can include a wake signal so that the processor and Bluecell radioset of hibernating Bluecell systems can be woken up when needed. These radiotags, as part of a system for finding lost articles and persons, combine the best of both worlds. The Bluetooth radiosets are entirely self-sufficient digital radios and can pick up BTLE transmissions from up to 1500 ft away. The cellular radiosets are native to cellular networks, and can quickly be located anywhere around the globe. Having both together provides a dramatic increase in search granularity, the cellular radio providing a general location and the Bluetooth radio permitting the owner of a lost article to activate a Bluetooth Proximity Locator Toolbox so as to locate the lost article by sight, sound, or feel, as will be described below. By combining the two radiosets in one device, the main disadvantage of cellular power saving mode (that the radio is turned off and cannot be reached) is overcome because Bluetooth radiosets have a standby mode at very low power that is always listening for other radio contacts even when the rest of the circuit is in deep sleep, and by addressing a message to the UUID of the Bluetooth radio, it can be activated and commands can be sent to the associated processor.

The cellular devices may receive all the information collected by the Bluetooth radiosets, particularly radio traffic identifiers, sensor data, and any messages, and can share the data with a cloud server or administrative network for further processing. Because the cloud host may have access to large databases and computational power, individual and aggregated sensor and radio traffic data from the Bluecell networks can paint a very granular picture of conditions in a local area, and lead the cloud host to make deductions of help to an entire community. For example, if each Bluecell accelerometer experiences a shaking at the same time, the cloud host may likely report an earthquake in progress, and can even send the information to the other side of town to communities who have not yet experienced the advancing P-wave. Similar advance warning of tsunamis using this system is expected to be better than anything else out there, and by tying in Bluetooth sensor data to marine radio as received by cellular hubs on shore, the long sought goal of sending a warning to the public at large of a pending tsunami may finally be within reach.

In one embodiment, all radio contact information captured by a TD is forwarded to a cloud server. As described in our U.S. Pat. Nos. 9,774,410, 9,900,119, and 10063331, the owner of a community Bluetooth device need not even know that the radio contact information has been relayed. However, the administrative server is then able to take action and issue commands and notifications according to the pre-programmed instructions of the owners of the device and the rules of the community. By sending a notification to the owner of the tagged device over a cellular network, the owner can also intercede and take action to recover the device. Similarly, the radiotag identifiers of a TD associated with a missing child can be posted to a whole community of users, and any radio contact with the TD will summon help to the location of the contact.

Bluecell systems are larger functional units that may include the Bluecell device, an application installable on a smartphone, a cellular network, and at least one cloud host for routing data and commands, but the larger community is also an essential part, and all the connections with all the other systems out there in the public domain. Thus the effective power of these new systems is by no means a linear expansion of what came before, it is an exponential expansion of qualitative and quantitative capacity.

As a basic tracking system for finding lost objects and radiotagged items, aspects of the system that are relevant include: a) Bluetooth radio proximity sensing functions; b) radio contact collection, data entry and mapping functions, c) network servers with relational database functions and some level of advanced machine intelligence, d) open access to the global IP packet data networks. The systems may also include one or more private IP networks for providing a virtual private gateway (VPN) function. Depending on the precise character of the cellular radiosets, they may be able to form networks with base stations, access points, and hotspots, and hence are not limited to proprietary portals to the internet. Like their Bluetooth mesh networks, they are capable of freely connecting and exchanging data with parties across the continent or across the globe. Thus the synergy is manifested in a very particulate local network of Bluetooth radios capable of ad hoc piconets, micronets and local nets combined with the cellular connections that can span 2 miles or 20000 miles. The capacity to bridge the intimate and the global is linked to the criticality that differentiates Bluecell from those based on GPS, WiFi, or cellular networks that lack dynamic, autonomous connections to Bluetooth networks.

Bluecell systems dual-radio Bluetooth and cellular systems and have a) a promiscuous capacity to join multiple local networks and change network memberships at random while in a sea of radio transmissions as Bluecell devices enter and leave radio proximity, and b) a capacity to engage with cellular devices on WAN networks and to access GAN networks of any kind worldwide, including through cable and satellite. At a local scale, the Bluetooth "ad hoc flickering mesh network" has also been termed a "scatternet environment" and is a unique radio capacity that distinguishes Bluetooth networking devices. Bluecell systems tap into this capacity while allowing global access to ad hoc mesh networks. Whereas cellular systems are highly structured by using router switches to create dedicated private point-to-point connections, the flickering or dynamically impermanent mesh networks now connectable to cellular systems results in a level of randomness that results in emergent properties. These systems are inherently more failure resistant because any individual radio member is readily bypassed if there is a component failure, and even a failure of the telephone system in some instances is overcome by the multiplicity of alternative web portals available in modern networks. Because the Bluecell devices of the present system can connect to both telephone and cable subscription networks, robustness of the overall network is dramatically increased.

Of themselves, autonomous ad hoc Bluetooth networks are unique for several reasons, first because they are readily embedded in both wearables and in things or organisms, second because they are digital radios and not digital on carrier wave but rather purely digital radios capable of energy efficient operation at essentially 0 dBm, and then because the radio devices in the network are true peer-to-peer (P2P) networking tools in which one device can act as master in one or more networks while simultaneously acting as slave in multiple other networks. While initially developed for pairing accessories to cellphones (Ericsson Mobile, Stockholm), Bluetooth pico- and micronets have been discovered to have surprisingly useful emergent properties because they dispense with base stations and access points and spontaneously form autonomous FH-CDMA peer-to-peer (P2P) mesh networks. There is no single point at which transmission in a network can be disrupted.

By hybridizing tracking devices with a combination of Bluetooth and cellular radiosets, yet another level of emergent properties is achieved. And surprisingly, the capacity to collect and aggregate highly granular sensor data has the potential, especially when used in conjunction with AI.

Figure 4:
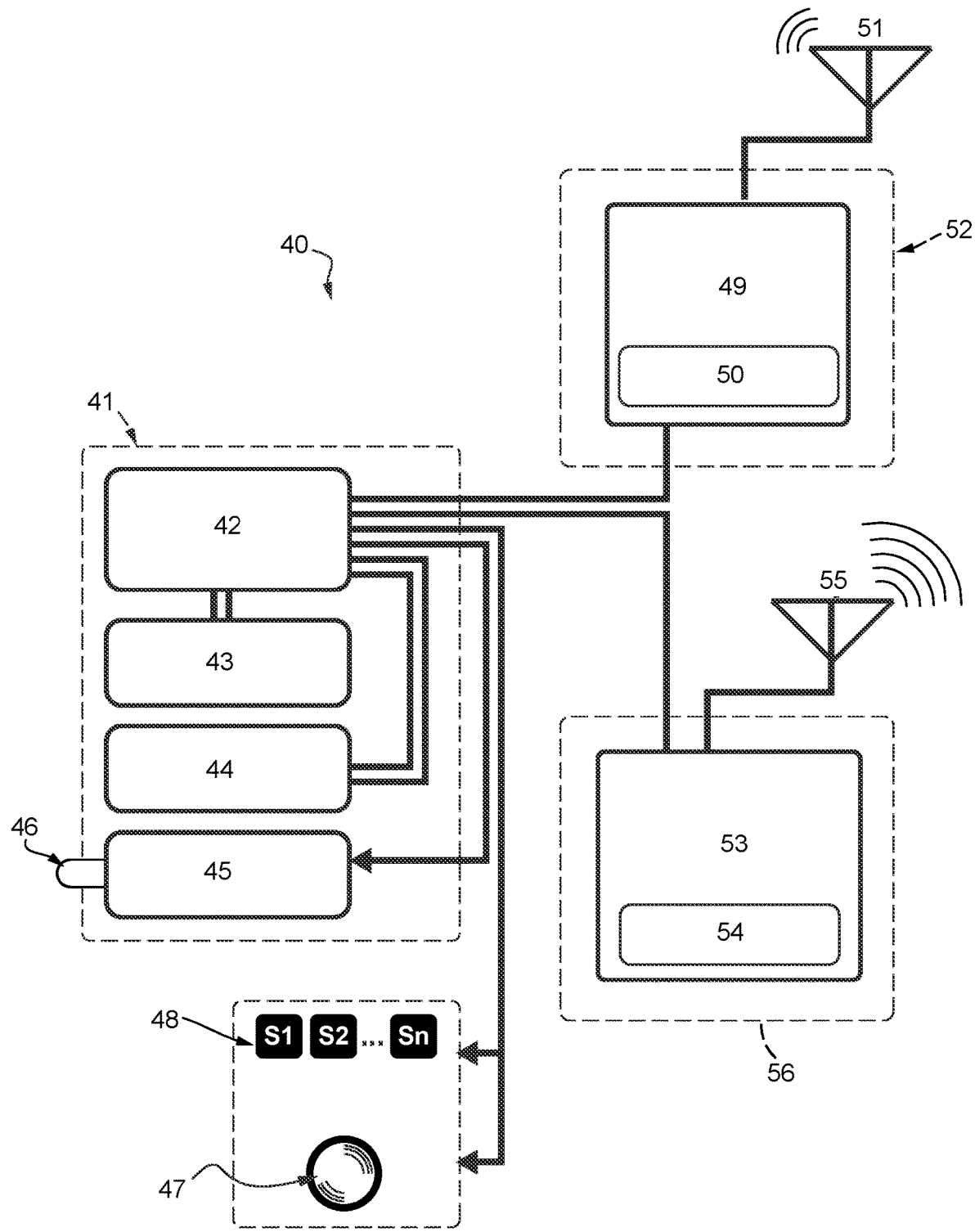
FIG. 4 is first schematic of a Bluecell tracking device embodiment having Bluetooth and cellular radio units under operational control of an integrated processor and ROM memory with stored instructions.

FIG. 4 is a schematic of a first Bluecell tracking device 40 having separate Bluetooth 52 and cellular 56 radio units that share control and are linked to a single processor 41 and supporting circuitry. The unit is battery powered. The radio characteristics of the two radiosets are quite different, one digital, the other a frequency modulation of a carrier baseband, and hence the signals are generally broadcast on separate antenna. The device includes two antenna, one 51 for the Bluetooth radio and one 55 for the cellular radio. Each radioset includes a unique identifier. The Bluetooth radioset 52 includes a Bluetooth core 49 and memory containing a UUID that is transmitted with every broadcast. The cellular module 56 includes the radio 53 closely linked to a SIM (54, subscription identifier module). The SIM is a microprocessor-based chip that generates an IMSI (international mobile subscription identifier) that is required to register the device on any cellular network. In some instances the SIM is a card inserted into a Molex connector for example. The SIM may be a nano-SIM, but in other embodiments the SIM is an eSIM (embedded SIM) that is integrated into the circuit board and is not removable. Future SIM units may be software based, but all rely on the use of 128-bit keys to authenticate the device. The manufacturer's IMEI (international mobile equipment identifier) may also be used for security.

The processor 42 may be a microprocessor or microcontroller and may include a co-processor or graphics processors. The processor is a solid state digital device that can be programmed, or otherwise configured, using software resident in ROM 43 or as firmware, or a combination of both software and firmware.

Flash memory 44 is provided to store data, including sensor outputs and history of radio contacts, including any timestamps and location stamps. An alarm apparatus 45 with LED 46 is also provided to aid in locating the radiotag when at close range. The alarm apparatus may include a speaker that can be actuated to attract attention and a buzzer that vibrates.

Typically an application is provided on a smart device such as a smartphone or tablet. The application supports a graphical user interface used to customize operational parameters of the TD and to support the Bluetooth Proximity Locator Toolbox, a set of tools used with the radiotags in finding lost items. The button switch 47 has multiple functions such as in actuating processor commands. A sensor or package of sensors 48 may be included. A motion sensor is typically provided because the information that a radiotag is moving or stationary is often relevant to whether it is lost.

Figure 5:
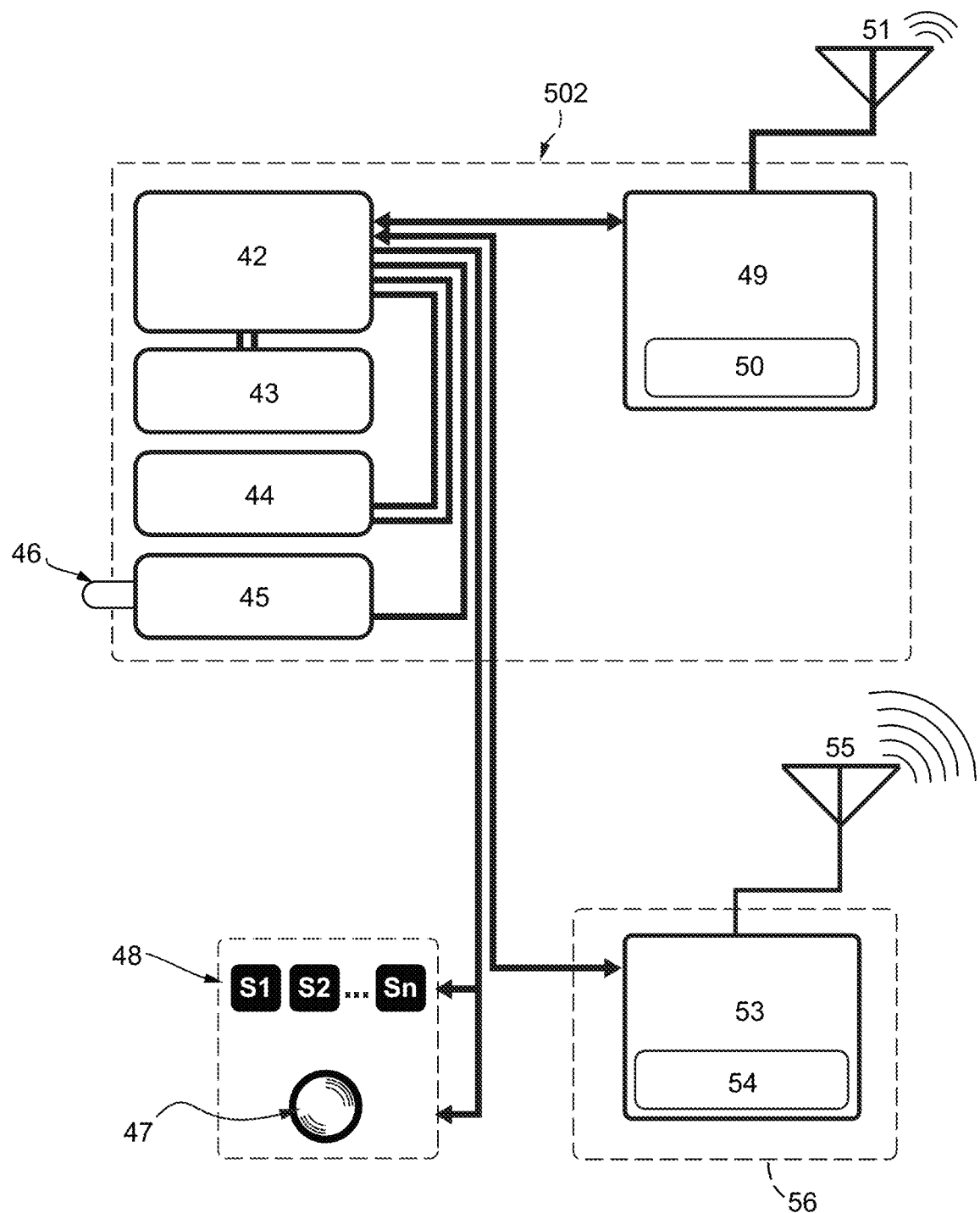
FIG. 5 is a view of a Bluecell tracking device embodiment and processor having an integrated Bluetooth radioset and a cellular radioset.

FIG. 5 is a view of an alternate Bluecell tracking device embodiment and processor 42. The processor is an integrated circuit 502 with Bluetooth radioset 49 and memory 50 for broadcasting the UUID. Integration of a particular processor and radio components is partly a matter of convenience but is also useful in miniaturizing the tracking device. As shown here, the processor assembly includes ROM 43, RAM 44, and an alarm apparatus 45 with LED 46. The cellular module 56 with radio 53 and SIM 54 is packaged separately. An interface circuit with multiple sensors 48 and a button switch 47 for manual actuation of some commands is also a separate unit so as to be mounted through or on a housing instead of on a circuit board.

The Bluetooth core is a low energy consumption processor and includes basic computing functionality for executing programming as well as the capacity to encode and broadcast digital radio messages that include records containing sensor data, time stamp, geostamp, and UUID numbers of radio traffic received. The master processor 42 can delegate the Bluetooth radio control to the Bluetooth core 53 to save energy. The Bluetooth core can cycle to a standby mode, a unique feature that allows an external "wake up" signal to bring it up to full power. By activating the Bluetooth core, the entire device can be activated. Even if the cellular radio, which has a sleep mode and is typically turned on only for short periods on a "call home" schedule, is turned off to conserve energy, it can be activated by activating the Bluetooth core. In more advanced Bluetooth chipsets, the "always listening mode" is awake, but other parts of the device are in standby or are asleep and power management circuitry wakes up accessory functions only when needed and only long enough to complete an assigned function before being put back to sleep mode. This aggressive power saving mode is responsible for the very long battery life of these tiny devices.

In one example, the cellular radioset is programmed to be in sleep mode, but by using the "always-listening" mode Bluetooth radioset, a signal is received on the Bluetooth radio and has a simple command, "Wake up!" Once awake, then program commands may be executed using the Bluetooth radioset to exchange data with a local smartphone, or by activating the cellular radioset of the Bluecell device to call directly to a cloud administrative center ("call home") on any available cellular network. Once a cloud connection is established either through a handset or directly with a cloud server, the user/subscriber has the option of adjusting the cellular power management, sleep settings, and frequency of location determination. By reprogramming the cellular radioset duty cycle and arranging to have it call home at frequent intervals, cellular location technologies such as AGPS and AFLT can be used to give frequent location or sensor updates. The limit on this is available power, but with frequent updates, a tracking map can be displayed with a series of "breadcrumbs", each breadcrumb a location, and the waypoints mapped to show where the radiotag is and to extrapolate where it is going. By switching on cellular continuously, battery life will be shortened, but the option may be loss of the radiotag and attached item, so having cellular tracking capacity extends the power of Bluetooth tracking alone.

Location service can also be provided over a cellular network by monitoring a cellular signal. POLTE (Dallas, Tex.) offers positioning-over-LTE as a way of relieving IoT devices from the hardware needed to determine location. An algorithm is used to estimate device position from time-of-flight or signal power data collected from multiple cell basestations. The geostamped data is collected by the cloud and can be displayed on a map to show the location and any direction of motion of the TD.

Figure 6:
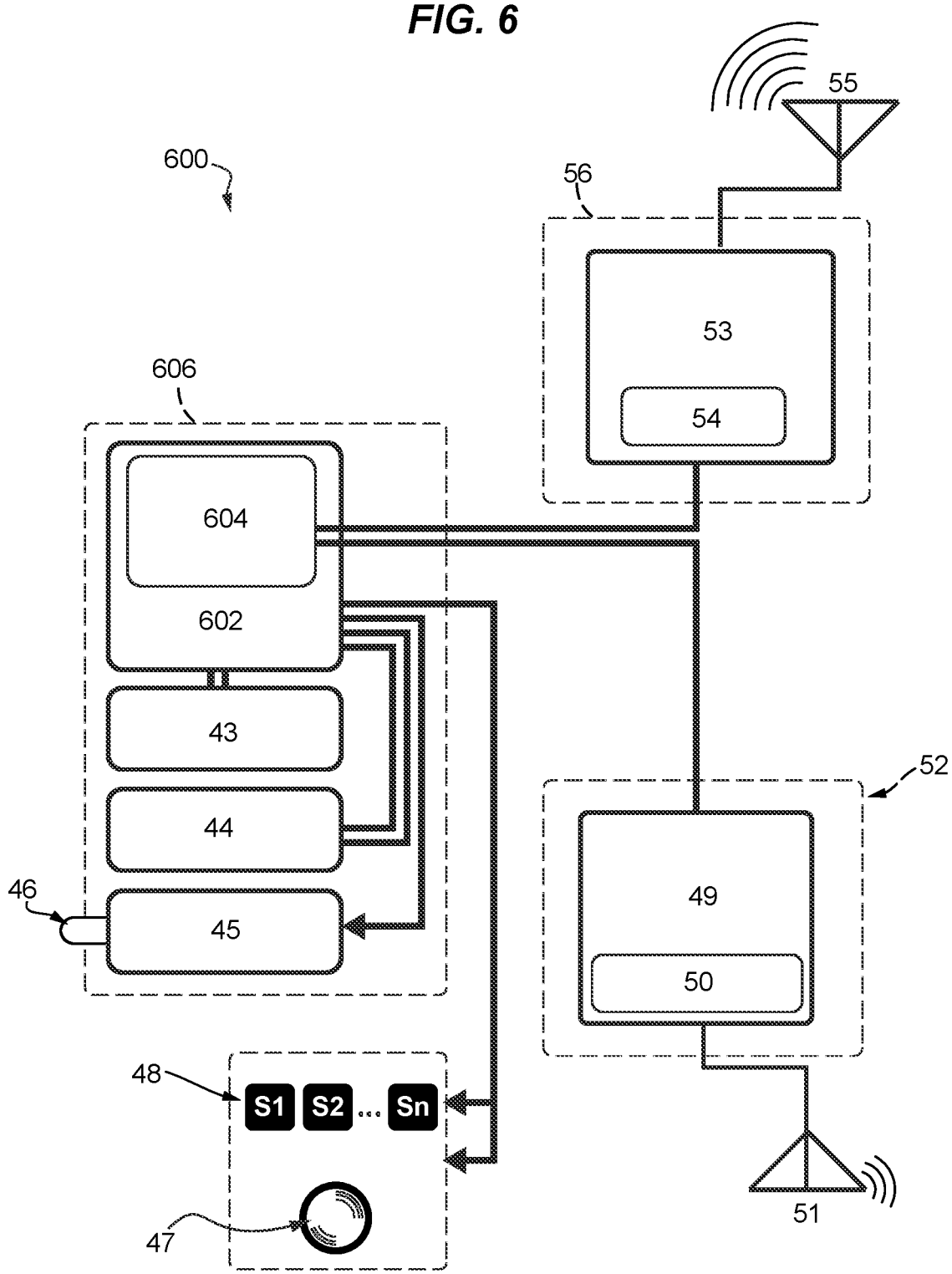
FIG. 6 is a view of Bluecell tracking device embodiment with an integrated processor with non-volatile memory for storing programming and a pair of radio sets.

FIG. 6 is a view of Bluecell tracking device 600 with a processor 604 and non-volatile memory 43 for storing programming. Also shown are a pair of radio sets 52, 56; one a cellular radio set 53 with subscriber identity module and AGPS or GPS chip 54, the other a Bluetooth radioset 49 configured to broadcast a UUID identifier 50, The radiosets have corresponding separate antennae 51, 55. Radio signals are multiplexed between the Bluetooth and cellular radio sets. The transceiver controller 604 is depicted here as a specialized module of the processor and is designed to prevent radio interference between the two broadcasts by TDME (Time Division Multiplexing). Care is also taken in antenna design to minimize crosstalk between the low energy Bluetooth signal and the higher energy cellular radio signal, which may also broadcast in the ISM band.

Figure 7:
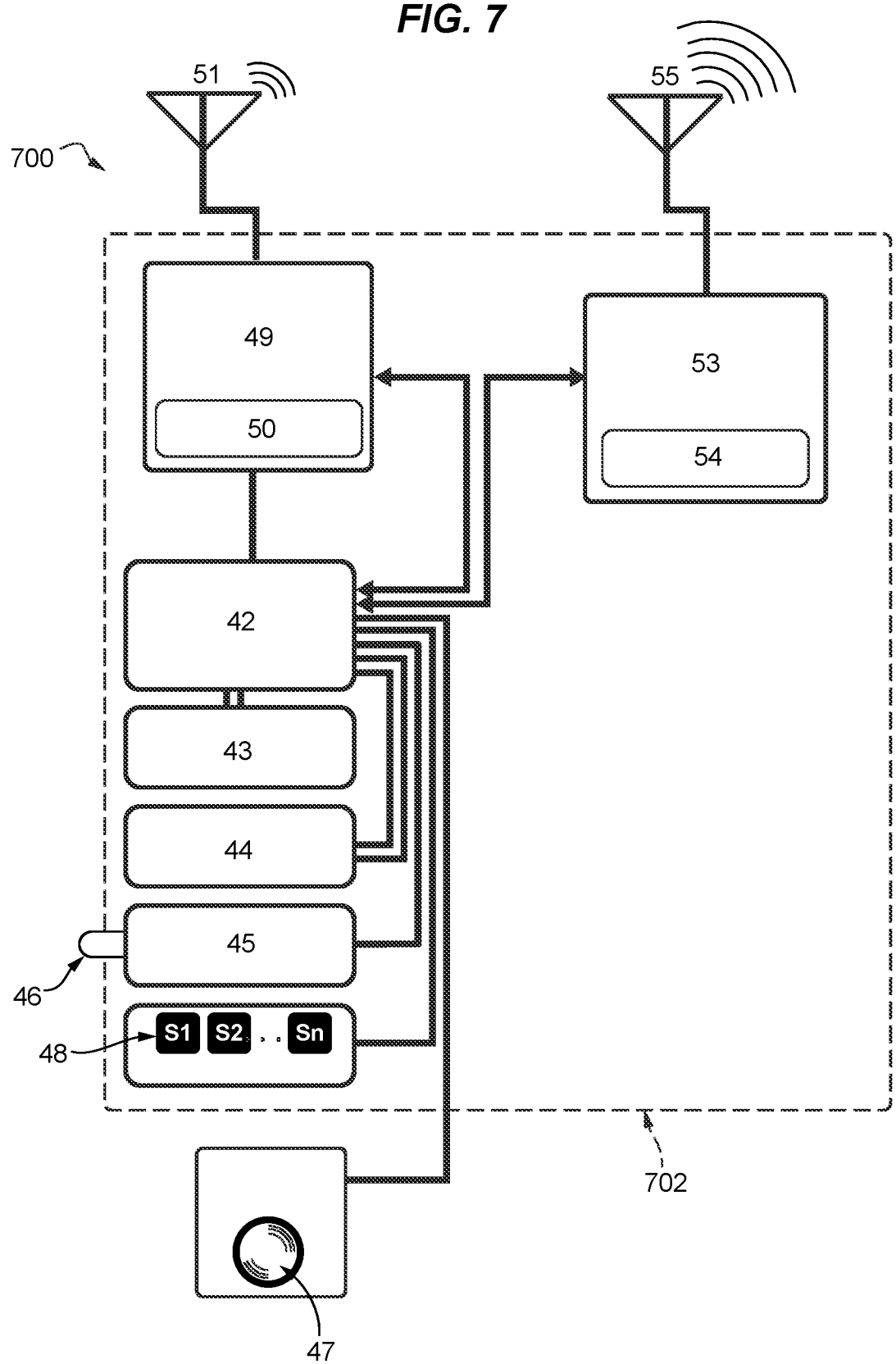
FIG. 7 is a schematic of an embodiment of a hybrid Bluetooth/Cellular tracking device in which an ASIC includes integrated radio sets, at least one processor, and supporting circuitry.

FIG. 7 is a schematic of another embodiment of a Bluecell tracking device 700, this one having an ASIC 702 that includes a fully integrated combination of both radiosets 49, 53, at least one processor 42, and supporting circuitry 43, 44, 45, 46. A sensor package 48 is also integrated into the ASIC. The cellular radioset includes a SIM module 54. The Bluetooth radioset includes a UUID 54. Two antennae 51, 55 are included. A button switch 47 is wired separately to the processor.

The antenna may be printed on the circuit board in some instances, but may extend from the board as by bayonet mounts and are secured to or embedded in faces of the housing members, which are generally made of a radiolucent material.

Figure 8:
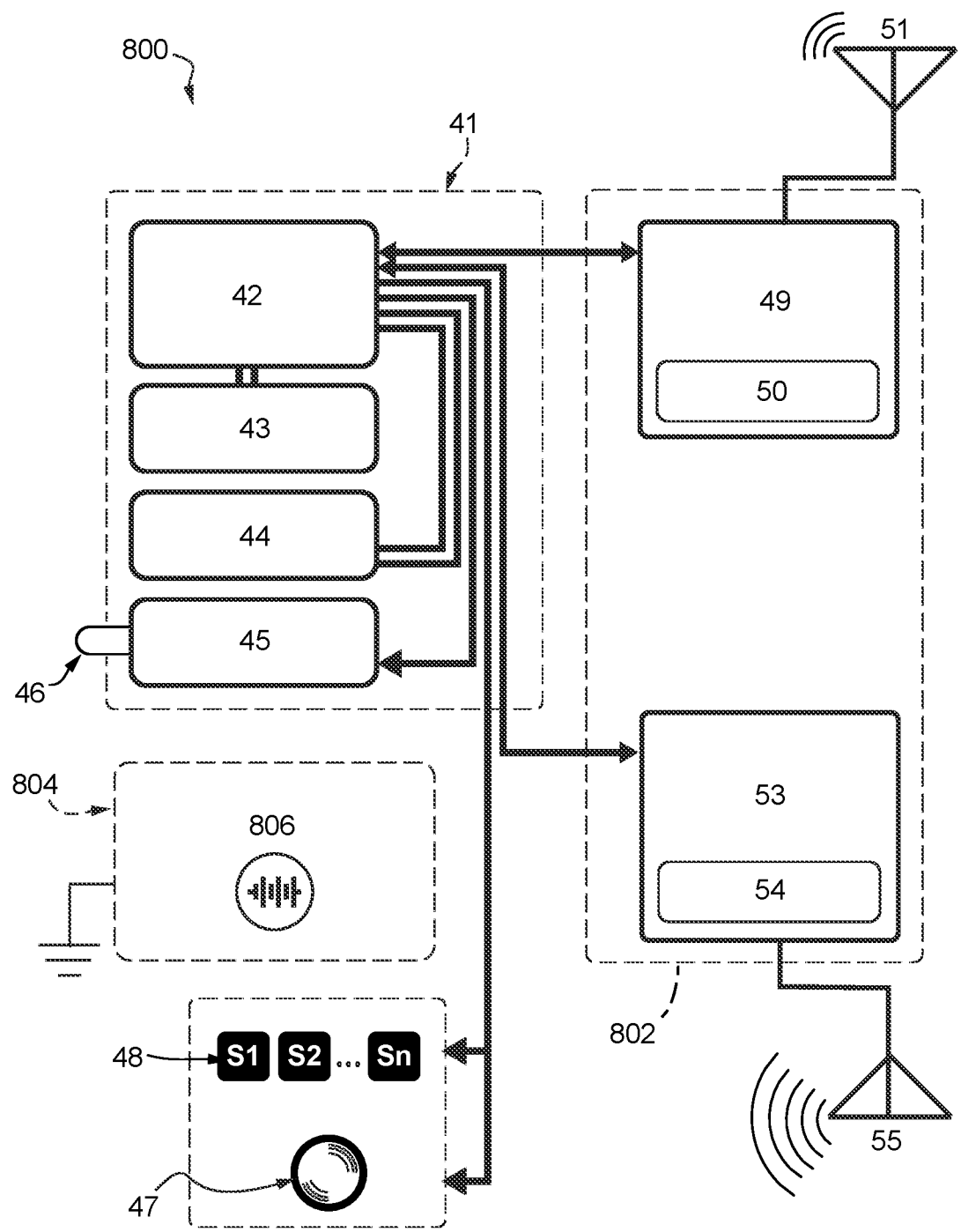
FIG. 8 is a schematic of a Bluecell tracking device with recharging unit.

FIG. 8 is a schematic of a device 800 having a processor 42 as a first chip or chipset 41 and a separate radio transceiver core as a second chipset 802 that combines a Bluetooth core 49, 50 and a cellular radio 53, 54 assembly. The processor assembly includes ROM 43, RAM 44 and an alarm apparatus 45 with LED. In some instances the processor instructions are not supplied by software but instead are hardcoded into an array of logic gates within the processor. The sensor module 48 and radio antennas 51, 55 are peripherals that attach to one or two circuit boards carrying the chips.

The chipsets are supplied with power from a single battery stack 806. Optionally, one circuit board can be removed to replace a coin cell battery or a SIM card. Both radios are slaved to the processor. Also included is a modular sensor package 48 and button switch 47.

The device may be disposable and have disposable batteries. More preferably, the units may be rechargeable and have rechargeable batteries. A recharging unit 804 is depicted here and shares a common chassis ground. Several recharging systems are compatible with the Bluecell devices. Not shown but optionally, we may include a solar recharger, an inductive recharger, or an RF radiowave harvester, for example.

Wireless chargers, also known as induction chargers, typically place one coil in a charging device or pad that is connected to an AC power source. Battery management controls are known in the art and may be implemented where warranted. A USB port may also be included, for example, with charging cable.

Figure 9:
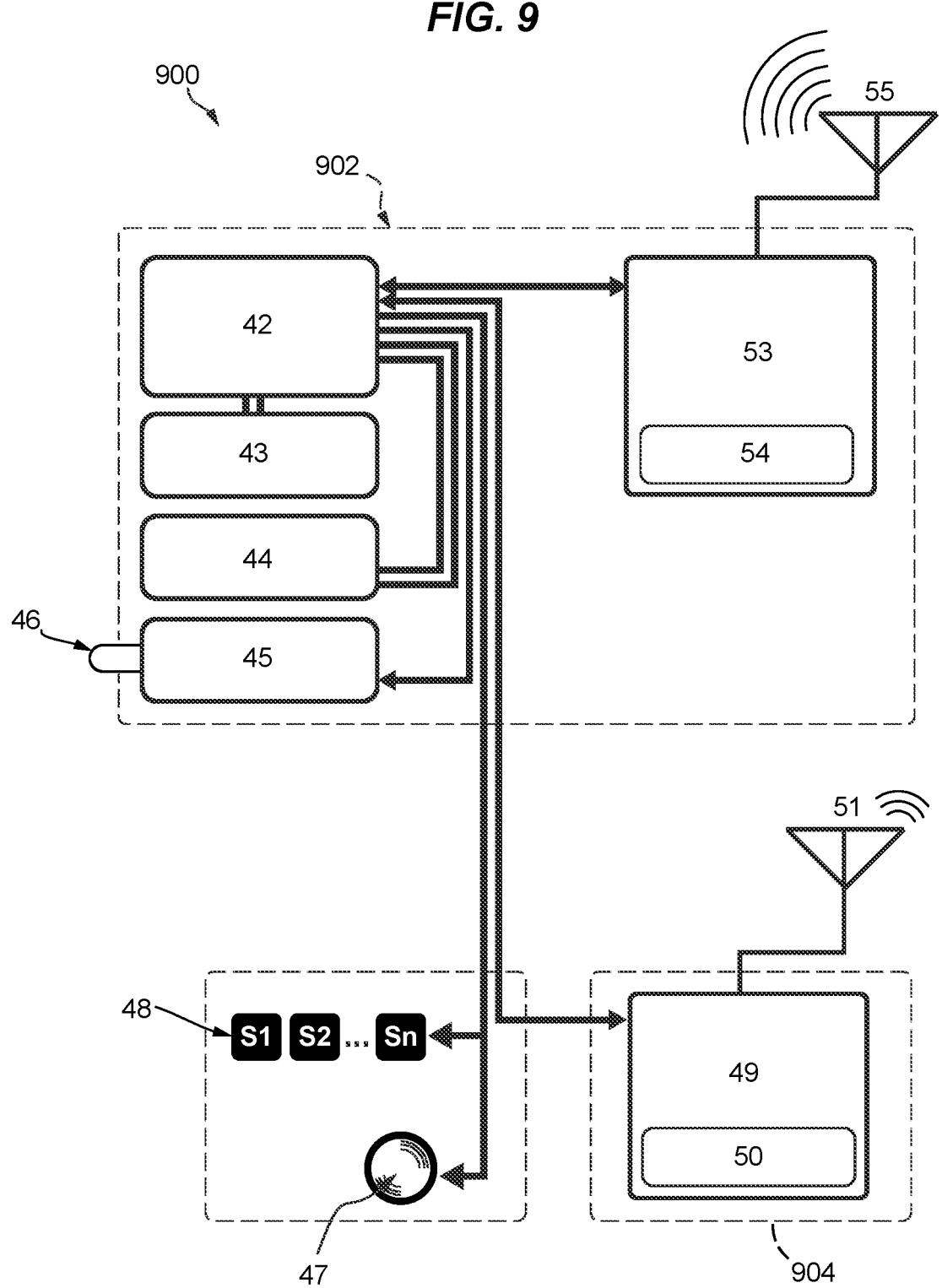
FIG. 9 is a view of an embodiment of a Bluecell tracking device with a cellular radio chipset and processor.

FIG. 9 is a view of an embodiment of a Bluecell tracking device 900 with an integrated cellular radio chipset and processor combination 902 that includes RAM 44 and ROM 43 memory, a non-volatile instruction set, an alarm apparatus with speaker and LED 46, and a sensor package 48 and optional button switch 47. The cellular module is joined to antenna 55. Also shown is a separate Bluetooth package 904 with core 49 (see U.S. Pat. No. 9,392,404), UUID identifier 50, and antenna 51.

The Bluetooth core is a low energy consumption processor and includes basic computing functionality for executing programming as well as the capacity to encode and broadcast digital radio messages including sensor data, a time stamp, and the UUID number. The larger master processor can delegate the Bluetooth radio control to the Bluetooth core to save energy. The Bluetooth core does not sleep, but has a standby mode, and a unique feature that allows an external "wake up" signal to bring it up to full power. By activating the Bluetooth core, the entire device can be activated. Even if the cellular radio, which has a sleep mode and is typically turned on only for short periods on a "call home" schedule, is turned off to conserve energy, it can be activated by activating the Bluetooth core. In more advanced Bluetooth chipsets, the "always listening mode" is awake, but other parts of the device are in standby or are asleep and power management circuitry wakes up accessory functions only when needed and only long enough to complete an assigned function before being put back to sleep mode. This aggressive power saving mode is responsible for the very long battery life of these tiny devices.

In one example, the cellular radioset is in sleep mode. Using the always listening Bluetooth radioset, a "Wake up!" command may be executed using the Bluetooth radioset or by activating the cellular radioset of the Bluecell device to call directly to a cloud administrative center or "call home" on any available cellular network. Once a cloud connection is established either through a smartphone or directly with a cloud server, the user/subscriber has the option of adjusting the cellular power and sleep settings, such as to a continuous or frequent operation if needed to track the device by cellular radio. By reprogramming the cellular radioset duty cycle and arranging to have it call home at frequent intervals, cellular location technologies such as AGPS can be used to give the user/subscriber's/subscriber frequent location or sensor updates. The limit on this is available power, but by calling home more often, a tracking map can be displayed with a series of "breadcrumbs", each breadcrumb a location, and the waypoints are mapped to show where the radiotag is and where it is going. Typically the software application or a cloud host can log and plot aggregated data to generate a map of where the Bluecell device is being taken. By switching on cellular continuously, battery life will be shortened, but the option may be loss of the device, so having cellular tracking capacity is clearly an improvement over Bluetooth tracking alone.

Figure 10:
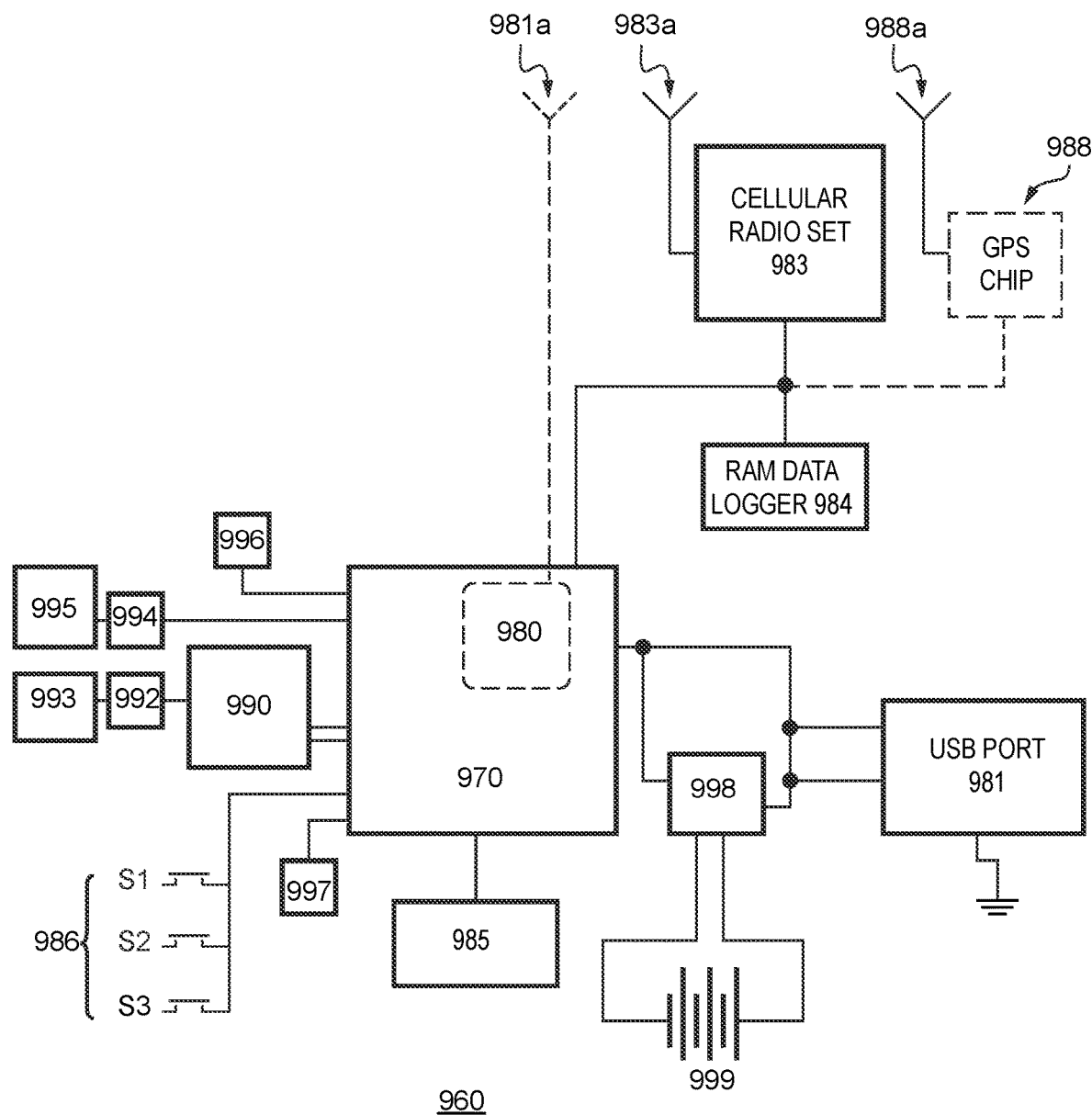
FIG. 10 is an alternate embodiment of a Bluecell radiotag.

FIG. 10 is a schematic 960 of another embodiment of a Bluecell device. Processor 970 includes a BTLE radioset 980 electronically coupled to an antenna 981a, including, if needed, an encoder/decoder for parsing digital radio signals. The processor can be programmed, or otherwise configured, using software resident in ROM (such as EEPROM 985) or as firmware, or a combination of both software and firmware. RAM 994 is also provided for storage of volatile data.

Cellular radioset 983 with cellular antenna 983a is configured to provide simplified communication on a private network. The Bluecell device is operated as a cellular device accessible by an IP address on a private network to find and track the whereabouts of the device via a dedicated and secure 5G private network or gateway VPG that is administered by a cloud-host administrative server. A SIM module may be installed to establish the exclusive IP address in the Bluecell device, with network access restricted to authorized parties.

The cloud administrative host implements the VPG network and uses the IP address to access the Bluecell device. By using the VPG to wake up the Bluecell device in a paging window as needed, sleep modes can be increased to save power. For example, an eDRX protocol can be overridden, or the parameters of a power saving mode modified. And by waking up the cellular device, then added commands and data can be transmitted to the Bluecell device and data can be uploaded from the Bluecell device. Once the cellular radio is on, then network-assisted location fixes on its transmissions may be performed automatically.

Use of private IP addresses with a VPG reduces the incidence of inadvertent, unauthorized, and network-incidental messaging that can drain battery life. The cloud host also adds a layer of artificial intelligence.

Use of AGPS dramatically improves the time needed for a user device to achieve a location lock. Devices having a cellular radio may wake up periodically, get a location fix, report the location to the cloud host, and then return to sleep so that the battery life is months or years. The VPG network may use the location information to create a "trail of breadcrumbs" of locations of the Bluecell devices over time by periodically generating and logging locations obtained by AGPS in an energy efficient manner. A motion sensor also improves the efficiency of the devices. For any given time period, if accelerometric motion is detected that is characteristic of motion, a position fix is requested and fulfilled. The position fix is not repeated unless motion is again detected. In a variant on geofencing, Bluecell devices in identified "safe locations" are queried less frequently for location updates and not unless motion data is consistent with an excursion that would take the Bluecell device outside a designated range of the safe location. The tempo of a walking person is one flag, the higher frequency vibration of an automobile ride is another flag that would trip a location update command inside the Bluecell device. Thus only the accelerometer needs to be monitored on battery power unless and until a location update command is scheduled in advance or a query is received from the cloud host.

The signal strength of the cellular base station can also be monitored, as is typically the case in cellular networks to monitor connections and when needed transfer connections from one cell to another cell. Typically, the Bluecell device location is only updated when a handoff is made between two cells. Depending on rules set by the cloud host that can be linked to the Bluecell device user's profile, to local events, time of day, and so forth, the cloud host can also be notified if the Bluecell device is reallocated from one cell to another. Because this can also occur when cell traffic is being levelled (i.e. by moving users from a crowded cell base station onto an adjacent base station having lighter traffic) the cloud host can monitor the base station carrier channels in the network path to differentiate location changes that are traffic load driven versus changes driven by a change in cell initiated because the Bluecell device detected a stronger signal from an adjacent base station and elected to initiate a handover to the new system transmitter.

In some instances, the cellular radio chip 983 will also contain a GPS position locator. In other instances, a GPS chip 988 and antenna 988a will be supplied as a separate component(s). Because GPS involves an energy-intensive signal acquisition and calculation, triangulation methods for determining location may instead be implemented using the cellular or Bluetooth radiosets, and such methods are satisfactory where multiple basestations having known locations are available, such as in most urban environments.

USB port 981 is intended to operate with charger 998 to recharge battery 999 but may also be used to download program upgrades, for product qualification and troubleshooting, and for any other purpose for which a USB port may be utilized.

Audio codec 990 is coupled by a LINE OUT to amplifier 992, which drives speaker 993. The speaker may be mounted on the housing rather than on a circuit board so as to take advantage of any resonance of the housing shell. The Bluecell device may include a vibrator driver 994 and one or more vibrators 995 configured to provide notification functions and may be combined with one or more buzzers. By selecting a higher dB piezoelectric buzzer (not shown), a FIND function can be realized analogous to the FIND PHONE function taught in U.S. Pat. No. 9,892,626, herein incorporated in full for all it teaches. Using the vibrator, a Bluecell device may be "nudged." A nudge is useful when a user of a parent device wants to attract the attention of the user of the Bluecell device, such as when a message is sent that needs a prompt reply.

Sensor package 996 may include one or more sensors that are not switch sensors and are thus distinct from switches 986 (S1, S2, S3). Various combinations of sensors may be provided in a sensor package. In some preferred embodiments, a sensor is a combined 9-axis motion sensor and temperature sensor. In one preferred device, a sensor is an integrated package having an accelerometer, gyroscope, and magnetometer for each axis. In some instances, the sensor package is incorporated into the processor.

As illustrated here, accelerometer sensor 997 is associated with processor 970 and may be used to trigger processor functions as in motion-control and left-behind notifications. Generally, an XYZ three-axis accelerometer is included. In some instances, the accelerometer may be integrated into the processor and has a number of uses. Input from the accelerometer, such as a double or triple tap, can be used as a wakeup signal as part of a power-savings sleep routine.

GPS chip 988 with GPS antenna 988a is shown as being optional because in some instances the GPS functionality will be built into the processor or into one of the radiosets, if present at all. Some cellular radio chips are provided with accessory GPS functionality integrated into the die. The GPS antenna 988a may be separate from the cellular antenna 983a as shown, but, in some instances, a combination package is used. GPS may be actuated at extended intervals to save power, and may be smart GPS, that is, activation occurs when there is a need, such as when there is motion of the wireless device or there is a situation in proximity to the wireless device (as detected from other data feeds) that necessitates, or can benefit from, closer tracking and monitoring of location. AGPS may be used to reduce power.

Figure 11:
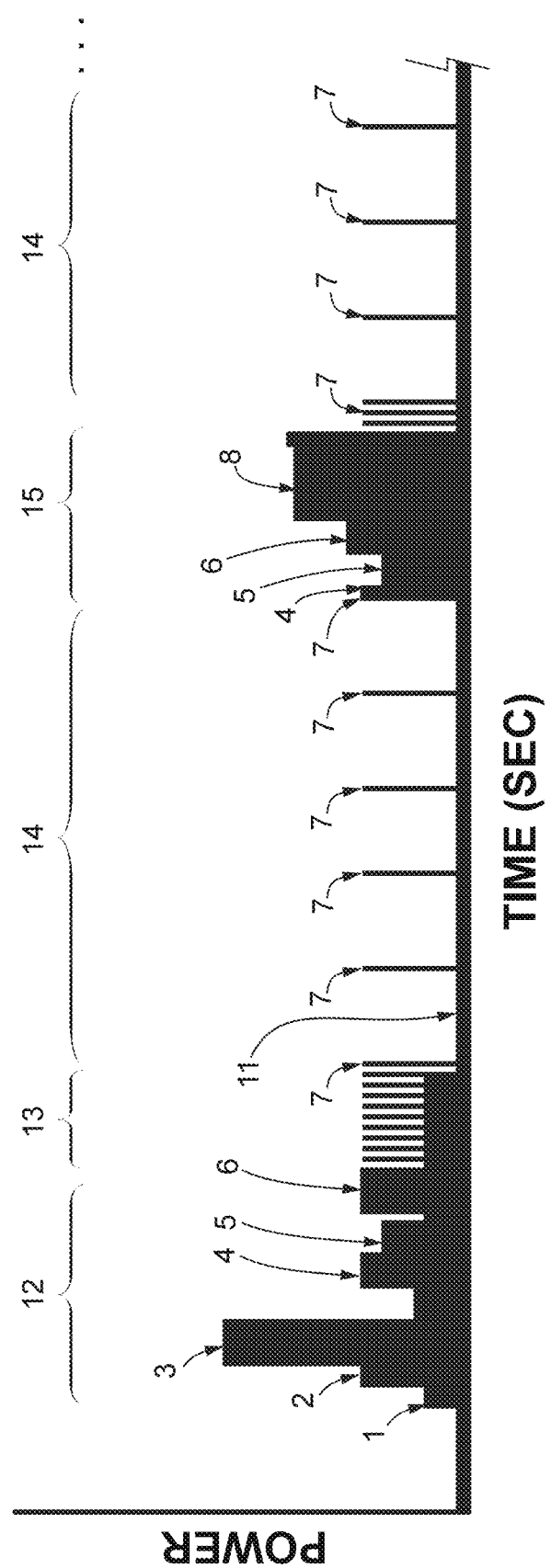
FIG. 11 shows a timecourse of power consumption in a cellular radio modem within a Bluecell radiotag through cold boot up, frequency scan, authentication, registration and then through a subsequent wake event and data uplink.

FIG. 11 shows a timecourse of power consumption in a cellular radio modem within a Bluecell radiotag through a boot up, frequency scan, authentication and registration with a network and then through a subsequent wake event with data exchange. The LTE-M standard established by the 3GPP group forms the basis of 4G and 5G cellular networks. The standard includes several layers and stacks that are relevant to power consumption on the user equipment side. Principal among these are RACH (random access channel control), RRC (radio resources control), PUCCH and PDCCH (paging uplink and paging downlink control channel), TAU (tracking area update), DXR (discontinuous reception), eDRX (extended or enhanced DRX), and PSM (power savings mode).

Tracking devices (TD) initially "attach" to the cellular network, when available, at a network node (historically termed an eNodeB or "base station") that defines the cell area of coverage. Several criteria, including signal power and traffic balancing are used to assign a cell to each TD. Power consumption during representative network connection functions is illustrated in FIG. 11. The power use in the attachment process 12 follows (for a new connection), a wake up 1 and boot period 2 within the TD, followed by a frequency scan of the airwaves 3 and a RACH (random access control channel) protocol that includes attachment request and acknowledgement, confirmation of a cell 4 for synchronization 5 and authentication, resulting in registration and data connection 6 with the network. The physical uplink control channel (PUCCH) is used to synch the transmissions so that data transfer can take place once the device is connected.

When connected and in data report 6, packet data can be exchanged by alternating downlink (DL) or uplink (UL), generally in a TDMA or FDMA protocol. Modulation is typically by phase shift keying (PSK) at a symbol rate that is established by the frame structure. Signal exchange is complicated by the need for acknowledgement (ACK) and automatic repeat requests (ARQ) that can contribute to higher energy consumption. Also, the TD microprocessor or controller follows the cellular modem into a wake state and executes commands in its stack, including any data collection, loading of registers, encoding for transmission, and serial forwarding of data to and from the cellular module broadcasts. On completion, the TD executes an RRC "release" to relinquish network resources and enters an idle mode 13, which is a lower power sleep mode interrupted by frequent listening periods. The TD periodically wakes up 7 from idle according to a pre-negotiated schedule corresponding to any of the network paging windows that are present in each hyperframe. Tracking area update is done to ensure that the TD has not left the cell. The length of time 11 between wake periods is negotiated with the network and defines an extended sleep interval 14 that can be customized with eDRX parameters. Reconnection to the network 15 is done using a RRC Resume protocol in which the device and network are already synched. The RRC Resume protocol also handles any updates to the power savings configuration.

In contrast to the initial random access channel connection, once the TD is registered with and in synch with the network, data can be exchanged when needed using the RRC Resume protocol. One example of a re-connect is "paging." While in eDRX, the PDCCH is tracked to maintain network synchronization. The TD monitors only some subframes, the PO (paging occasions) and the PF (paging frames). Paging is a process in which the network calls out any TD for which DL traffic is available. Individual TDs are differentiated by their IMSI and the SIM module authentication done during the initial registration. Once registered, the TD does not have to listen to the entire hyperframe because the network clock and the TD clock are synched in the registration process and agree on a schedule so that the TD can wake up precisely when its pages are scheduled to be announced. If the TD is not paged during a paging window wake period, the TD goes back to sleep.

At the physical level, cellular radio relies on a network clock and a frame structure. Each transmission includes channels separated by frequency and frames separated by time. Frames are grouped into hyperframes as the basic repeating unit. By convention, each hyperframe repeats every 10.24 seconds. Each hyperframe includes a few paging transmission windows (PTW) in which the TD can listen for its pages and a few RRC windows in which the TD can request random access to uplink data.

Acknowledgement and response to a page follows the steps of the RRC Resume protocol 15, which includes cell confirmation 4, synchronization check 5 and data exchange 6 followed by release 8. The TD can then enter an "idle mode" with minimal power savings or save battery by returning to the deeper eDRX sleep session 14 with intermittent wake up 7 to check for pages.

TAU (tracking area update) also can be configured so that the TD wakes up on an extended timer at intervals as long as 413 days in the IoT release of NB-IoT and LTE-M.

During a wake period, any sleep mode can be modified or overridden by cellular radio command. A Bluetooth radio transceiver can also receive an override of eDRX or other sleep mode in another way. A Bluetooth connect request data packet with cellular power management protocol override signal can be sent and the Bluetooth radioset will be configured to wake the cellular radio transceiver module and cause the cellular power management protocol to be overridden, such as by a command to the cellular radio to CALL HOME or by increasing the paging window frequency, as well be discussed below.

Because the power burn rate during active broadcasting is significant, several power savings features have been implemented in LTE-M. Discontinuous reception (DRX) modes have been enhanced to place the TD off line for selected time intervals. In recent LTE-M releases, eDRX (extended discontinuous reception) and PSM (power savings mode) have been added. These can be used separately or in combination. The eDRX sleep mode can be incremented from about 2 sec to about 52 min in some LTE-M releases.

Figure 12:
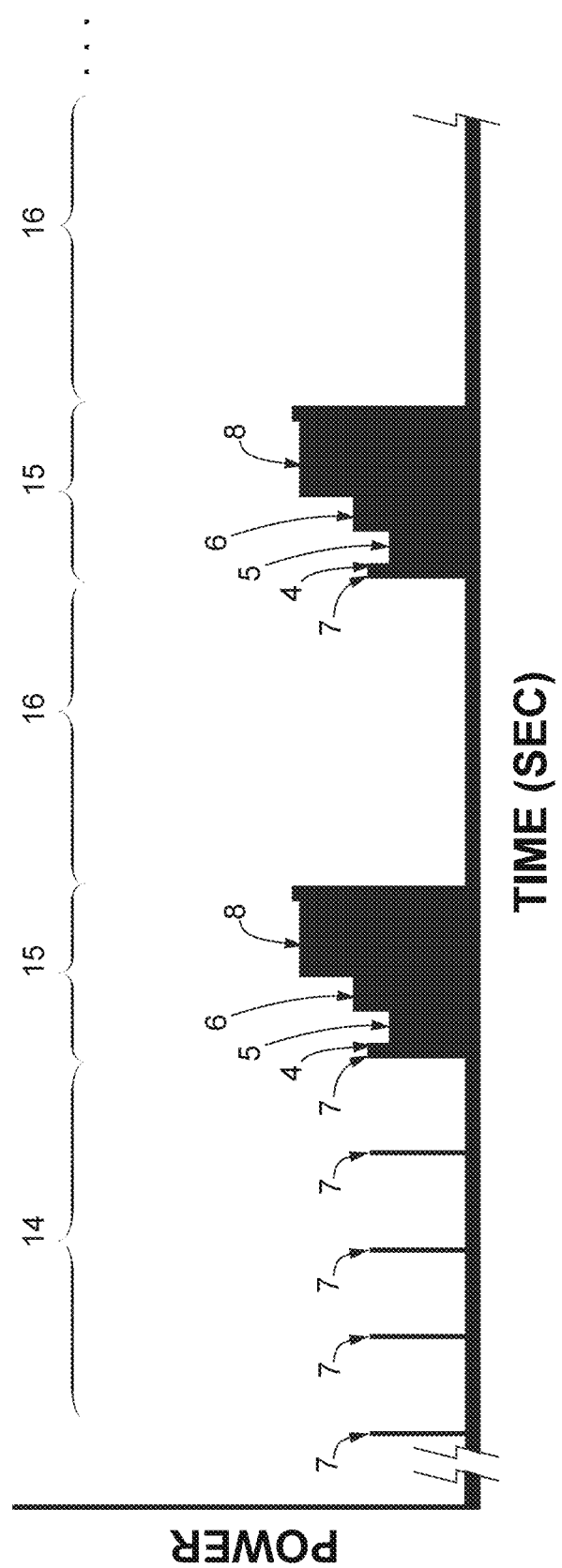
FIG. 12 demonstrates LTE-M cellular radio power management.

FIG. 12 is a schematic of power consumption for a TD device transitioned from eDRX mode 14 to the much deeper sleep of PSM mode 16, where the device is off line for extended periods of time. This scenario assumes that during wake periods, the device opens a transmission to the network to upload data collected during sleep by the Bluetooth radioset and stored by the MCU in flash memory. Data collection can include sensor data, but also radio traffic data such as a listing of radio contacts and their timestamps. The network administrative host can use this information to assist subscribers in tracking and finding lost objects and can aggregate sensor data to paint a picture of local conditions.

Figure 13:
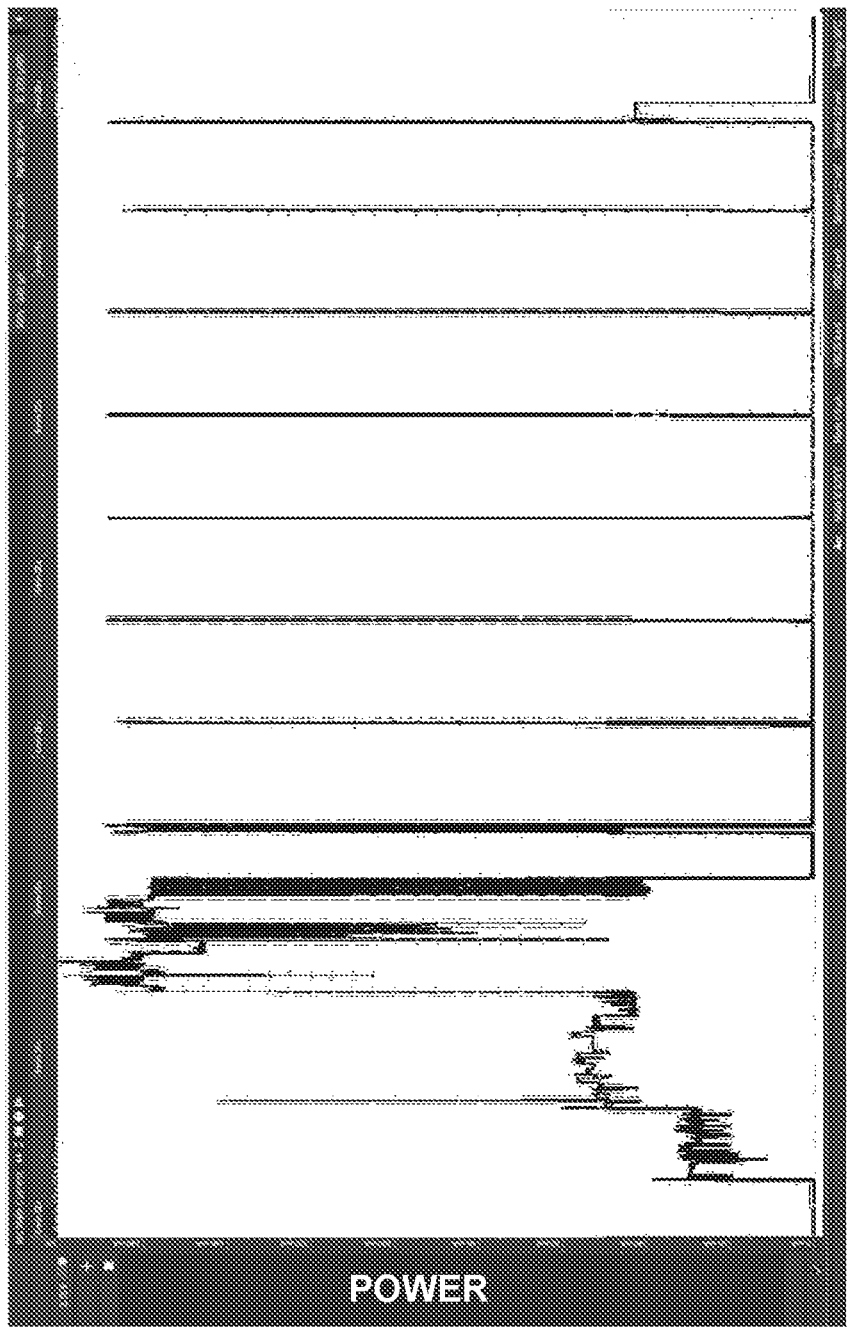
FIG. 13 reproduces an oscilloscope image of instantaneous power consumption during a radio event.

FIG. 13 is an oscilloscope trace showing energy consumption during cell radio activity, including a TAU update with RRC resume and data exchange. Collecting all the figures, an energy budget can be estimated. At an eDRX paging cycle of about 300+ seconds and a TAU cycle every 3 hrs, the total paging window listening costs are about 1500 uAh-day. Use with a motion sensor increases the energy consumption by about 1 uAh-days. The total device background draw absent activity is about 50 uAh/day. Using these figures, a 500 mAh battery can have a service life of more than 300 days, an 800 mAh LiPo battery in a tracking device is able to operate with data reporting for more than 500 days. In contrast, a stock battery for a Galaxy smartphone (Samsung, Seoul NK) is rated at 2600 mAh and requires daily recharge.

FIG. 14 estimates the energy consumption of a BTLE radioset per connection event 19 lasting about 3 ms once every 1 second, where parts of the curve show the processor turn on 20, a transmit period 21, and a listening period 22. The background activity is standby power consumption. These devices are characteristically provided with multiple energy saving modes that permit the developer to select a part of the chip needed for listening as an isolated function.

The following figures are representative:
Dormant/hibernate=0.05 uA
Deep sleep between TX/RX=2.4 uA
RF Transmit (every 1 sec)=3.2 mA
RF Receive (every 1 sec)=3.2 mA
BLE stack processing=50 mA Based on a wake cycle of 2.4 ms with sleep in between, the average current draw for a 500 mAh battery corresponds to a service life of about 720 days. Newer Bluetooth-type devices have the capacity to turn off layers and parts of the stack selectively according to whether they are needed or not, and to turn them back on with minimal latency so as to achieve a very impressive energy efficiency. Latency is quite low, even in deep sleep, and may be on the order of 20 usec. From hibernate, the startup time is about 1 msec.

Combining the BTLE current draw and the cellular radio current draw, the device service life with a 500 mAh battery may be over 500 days. A device having a battery life in the field of greater than 1 year is achieved. And the Bluecell device can be accessed during that period, either routinely when the cell module wakes up to check for pages, or with an assist from the cloud or a smartphone, where the signal that wakes the device is a Bluetooth message. Importantly, a standby condition is implemented which permits Bluetooth devices to be "always listening" for compatible radio traffic even when other functions are at low power idle or off. This is an essentially "receive-only" mode which allows a Bluetooth beacon, for example, to passively listen for relevant radio traffic and actuate added chip features only as needed. We structure the Bluetooth core to power down any system not of immediate need but to keep the radio receiver in a low power "always listening" state.

Part of any Bluetooth radio device is the Bluetooth promiscuity in linking to and exchanging data with proximate devices regardless of identity. Within radio proximity, the physical range of devices from a receiver can be monitored by RSSI and the most proximate devices given priority in making connections. The UUID identifiers and approximate location of the radio contacts made can be transmitted to a cloud so that a server can search the data for radiotags of special interest. For example, transmissions from a device posted by one user as "lost" can be identified by a passing stranger, and the cloud can notify the proper owner. Thus the radio architecture is robust in achieving an unparalleled capacity to capture local Bluetooth radio chatter and cellular radio signals.

When in proximate Bluetooth radio contact, a wireless handset that has an installed program or "application" can be used to activate an alarm apparatus on the TD. The alarm may include a light, a speaker, and a buzzer, for example. We term this the Bluetooth Proximity Locator Toolbox. By activating the alarm state, so as to sound a repeating tone, vibrate, or strobe a light, the user will hear, see or feel the radiotag and is lead to its location so as to recover the item. So if the missing object has been buried under a stack of papers, it will be quickly uncovered. With Bluecell devices, a cellular connection to the TD can be used to activate an alarm apparatus, although Bluetooth radio, by its need for proximity and lack of a need for a supporting radio network, may be more direct and reliable in doing a search.

Figure 15A:
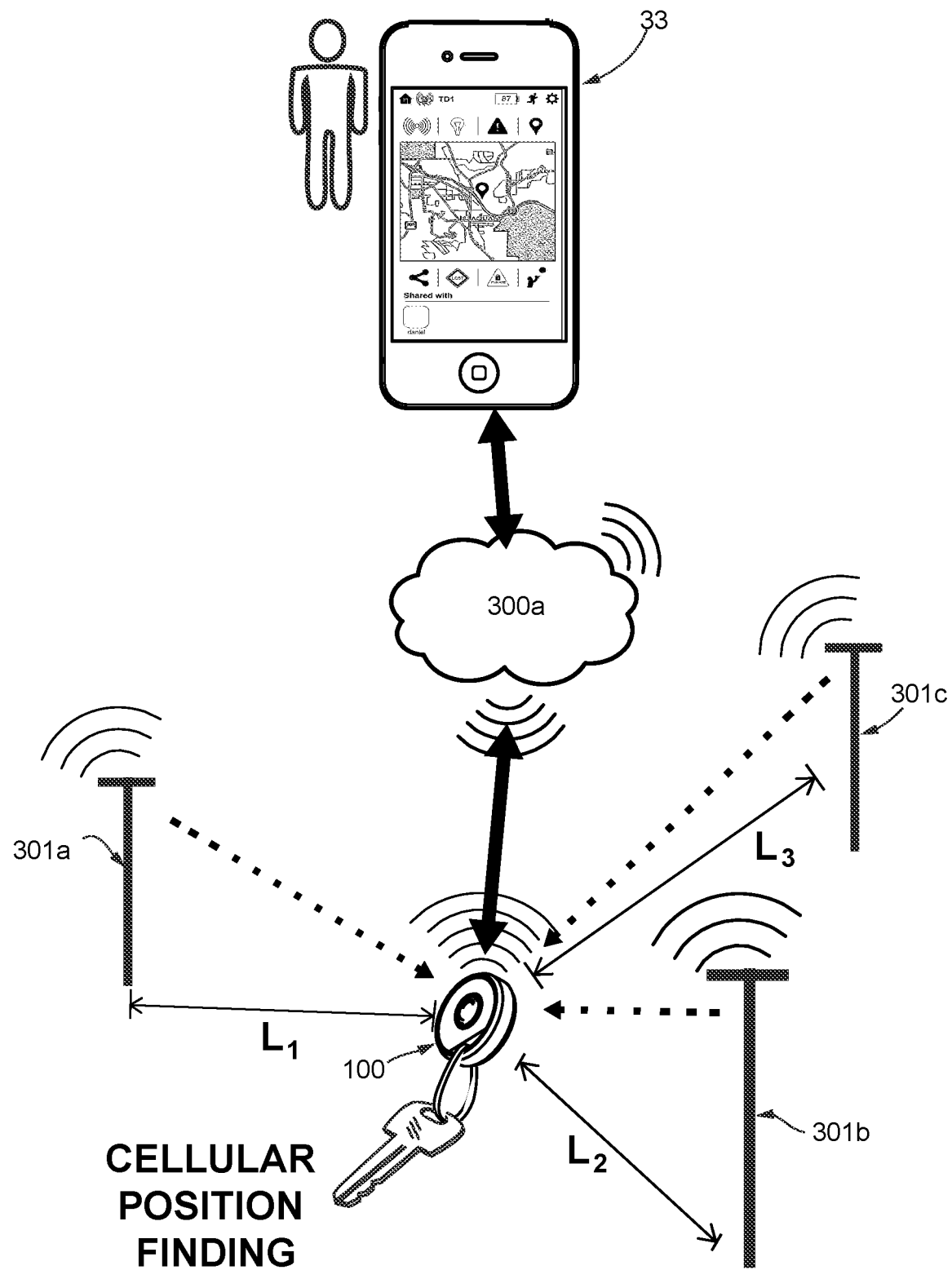
FIGS. 15A and 15B are views of complementary activities of cellular position finding and Bluetooth proximity locating as used to find a radio tag.
Figure 15B:
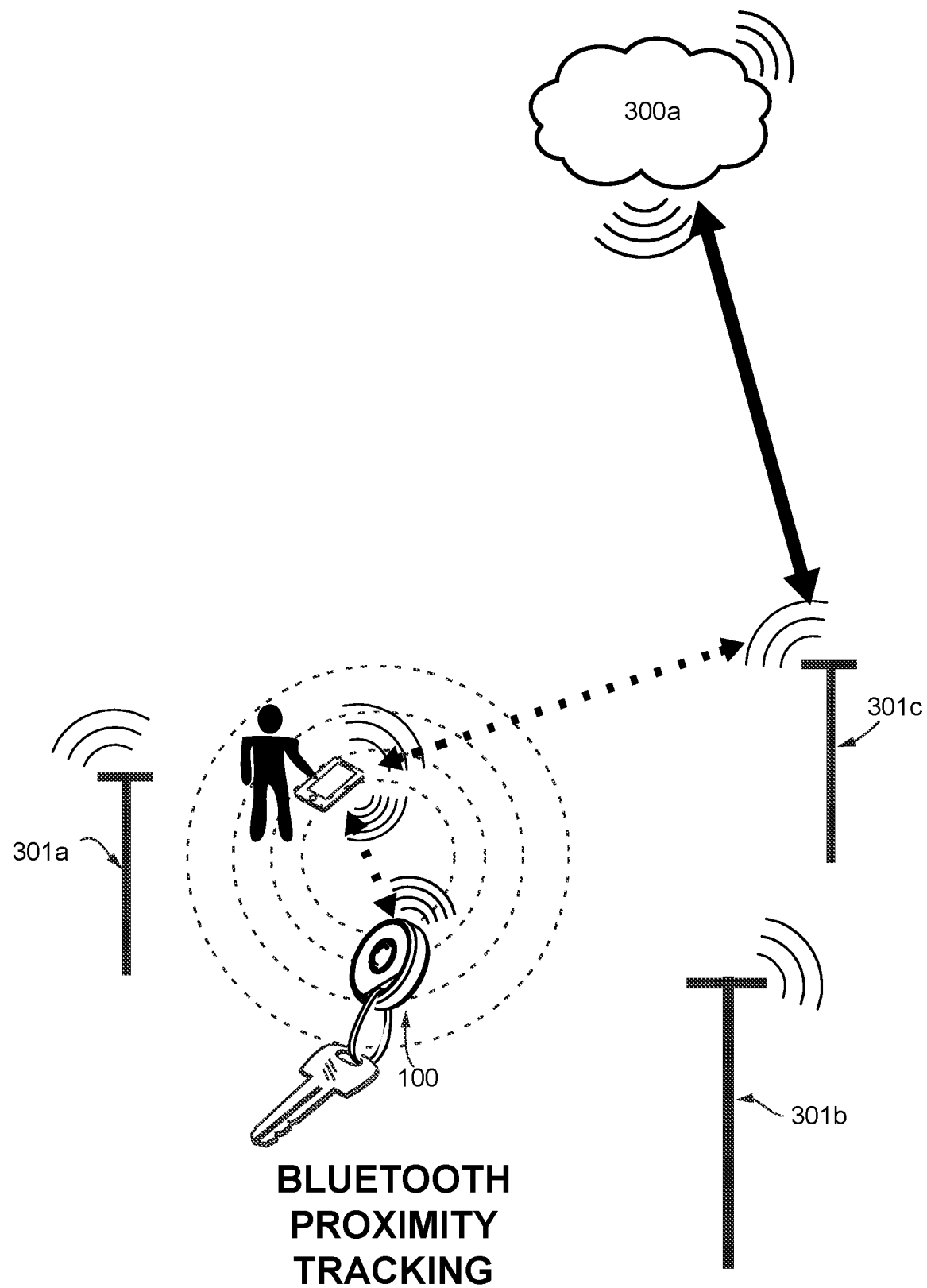

FIGS. 15A and 15B are first and second views of a tracking sequence for finding a missing Bluecell radiotag 100 that in a first stage begins with a location estimate made by triangulation from cell towers. Triangulation can be by time-of-flight, by relative signal power, or a combination, and the number of cell towers used in position calculation will generally include three or more towers 301a, 301b, 301c. In a second stage, when close to the radiotag, a handset is used with Bluetooth Proximity Locating Tools provided in a software application, shown here installed on a smartphone 33. In a final stage, the search is completed by activating a light or a buzzer on the missing radiotag and then using "eyes and ears" to complete the search.

In the first view (FIG. 15A) the Bluecell radiotag is receiving location information from a cluster of cell towers by a process of advanced forward link trilateration (AFLT) as an alternative to the traditional triangulation with directional antennas. Signal echo time is used instead of measuring theta, for example, to generate a more precise map when signals from several proximate cell towers are available and the measured distances can be used to solve several simultaneous equations for the location relative to the towers. This information is then reported to a cloud administrator and may be accessed or pushed to a user/subscriber's smartphone as a notification, a command, or with a request for further instructions. Because raw signals have power and time as well as identifiers, the SIM module in some handsets can do trilateration to make a precise determination of location based on echoed signal time of flight measurements and confirmed by the power of the signal.

AGPS may also be used. Generally, a specialized chip is incorporated in the handset and operates with the subscriber identification module to enable the handset to receive location based on the active tower in the carrier's network (the tower to which the handset is currently connected) and using that information to reduce the time necessary to compute a GPS signal location calculation. The handset itself may also be capable of performing a complete GPS location calculation, but this is energy and time consuming and is typically done only on special command.

Alternatively, client software determines the location of the handset by sending its IMSI and records of signal strengths and timestamps of the neighboring cells. That data is continuously updated in transmissions to the cell system operator. Using AGPS or GPS, the system operator makes a reasonably precise calculation of the location of the originating signal and stores that for use such as when an emergency call is received. The information is available to local law enforcement in advanced 911 systems and is also available to the originating cellular device.

Location may also be crowdsourced by sharing GPS, AGPS or AFLT position determinations with neighboring devices over short range ad hoc networks. And of course there are hybrid methods in which several of the above positioning methods are combined to obtain a most accurate current position relative to the neighboring physical topology. The accuracy is sufficient to easily follow a roadmap or to find the nearest gas station and can be used in conjunction with Bluecell radiobeacons to map out special places in a city (where the beacons are installed) and for advertising. Updates on current traffic conditions or special events can also be routed to users in timely updates, a use of crowd shortcutting described in more detail in U.S. Pat. Nos. 9,774,410, 9,900,119, and 10,063,331 and as described in U.S. patent application Ser. No. 15/959,250 and US. Pat. Appl. Publ. No. 2018/0131455, all of which are co-assigned and are incorporated here by reference for all that they teach. And now, with the integration of cellular connectivity on board, the power of these tracking devices in community-operated "cloud cut" systems is increased by new powers that are the emergent properties of complex systems, properties that cannot be predicted from the sum of the parts.

Location information can also be collected and used to create displays of positions and to mark waypoints (recording a table of breadcrumbs or waypoints so that a user/subscriber is never lost or unable to trace their steps back to a parked vehicle) for example. This function can be automated using cloud services to keep track of the way to one point when moving to another.

In a second view, FIG. 15B illustrates a second stage of a search and is conducted using the Bluetooth radioset. Bluetooth proximity mapping tools on board, and a compatible handset. The user/subscriber is able to do RSSI ranging and make an educated guess about where the missing radiotag is; then by actuating an alarm state on the radiotag (generally a buzzer or a flashing light), the user can quickly zero in and recover the item. Bluetooth range finding may be initiated at distances of 300 to 1000 ft under ideal radio conditions, but proximity tracking is strongest within 30-40 yards, and for longer distances, the cellular tracking techniques discussed with respect to FIG. 15A may be more effective. The two tracking systems are complementary, and in some environments, the two systems can be used simultaneously, such as when the cellular system for determining location is not precise. For comparison, commercially available GPS, by itself, is accurate only to 20-30 yards. Thus the light, speaker and buzzer of an alarm apparatus that can be activated when the user is within sight or hearing of the radiotag is more effective than GPS alone.

In doing a search, the user/subscriber is always well served by scanning the local area using the Bluetooth Proximity Locator Toolkit. This includes RSSI and audio/visual alarms that will reveal the location of any radiotag in a house, office, garage, car, playground, or other area where the user suspects the device might be.

That failing, a report of the missing radiotag can be posted on a cloud host. The cloud host will then routinely scan radio traffic in order to detect the UUID or IMSI of the radiotag. When the cloud encounters the radiotag identifiers, circumstances may permit a cellular connection to be made. The radiotag's cellular signal will be received if the missing device enters a scheduled cellular WAKE UP period while a cell tower is within radio proximity. More commonly perhaps, first contact will occur when one community radio encounters the UUID of the always listening Bluetooth radioset of the missing device and the two radios exchange identifiers. The discovery protocol will be preprogrammed so that the system is prepared and can instantly send a WAKE UP and CALL HOME command to the Bluecell, using background services in the community radio to transmit the command. The command will typically include a new instruction on frequency of the WAKE UP period and specific instructions about how frequently to CALL HOME.

The owner is also notified and the system begins putting together information to construct a preliminary location of the missing device. First contact enables the system to now use cellular communication and more powerful and more wide ranging location tools. These can include AGPS, capturing actual GPS locations from nearby smartphones, triangulation from cell towers, advanced forward link trilateration (AFLT), POLTE, and use of community resources to identify radio landmarks associated with the first contact. A map is constructed and the system may present a detailed GUI to help the owner grasp the information and take action. Based on where the initial contact is, for example, the owner can send the information to friends who might be able to assist if the device has been left at a friend's house.

The missing radiotag may also be transmitting relevant sensor data from an on-board motion sensor. A strategy for finding the device is quite different if the missing device is stationary versus a device that is on the move. If stationary, the cloud host can assemble aggregate information to finalize a consensus location (the office, the grandparent's house, the doctors' office, the restaurant, etc). It is then up to the owner to go there and do a sweep using the Bluetooth Proximity Locator Toolkit to find the device either using an RSSI sensor as an indicator of distance, or activating a visual or audible alarm. Positions obtained by Bluetooth RSSI mapping are generally about as good as those obtained by commercial GPS.

The device is more difficult to locate if it is moving. The assistance of the cloud host is essential. The cloud host will receive periodic reports of cellular contacts, cellular coordinates by GPS, Bluetooth contacts, and may be able to use predictive algorithms to extrapolate possible destinations or intercept points were a realistic attempt can be made to recover the device. Receiving location information from a cluster of cell towers by a process of advanced forward link trilateration (AFLT) or AGPS as an alternative to the traditional triangulation with directional antennas has proved increasingly accurate in areas covered by cellular service carriers when used in combination with machine intelligence now becoming frequently a part of every online search. Chances are quite good that the location is going to be accurate within a few yards.

Once the item is recovered, the cloud host will redesignate its services to other tasks and the owner will recognize that the service pays for itself. The cloud locator service can also locate errant children or pets.

Figure 16:
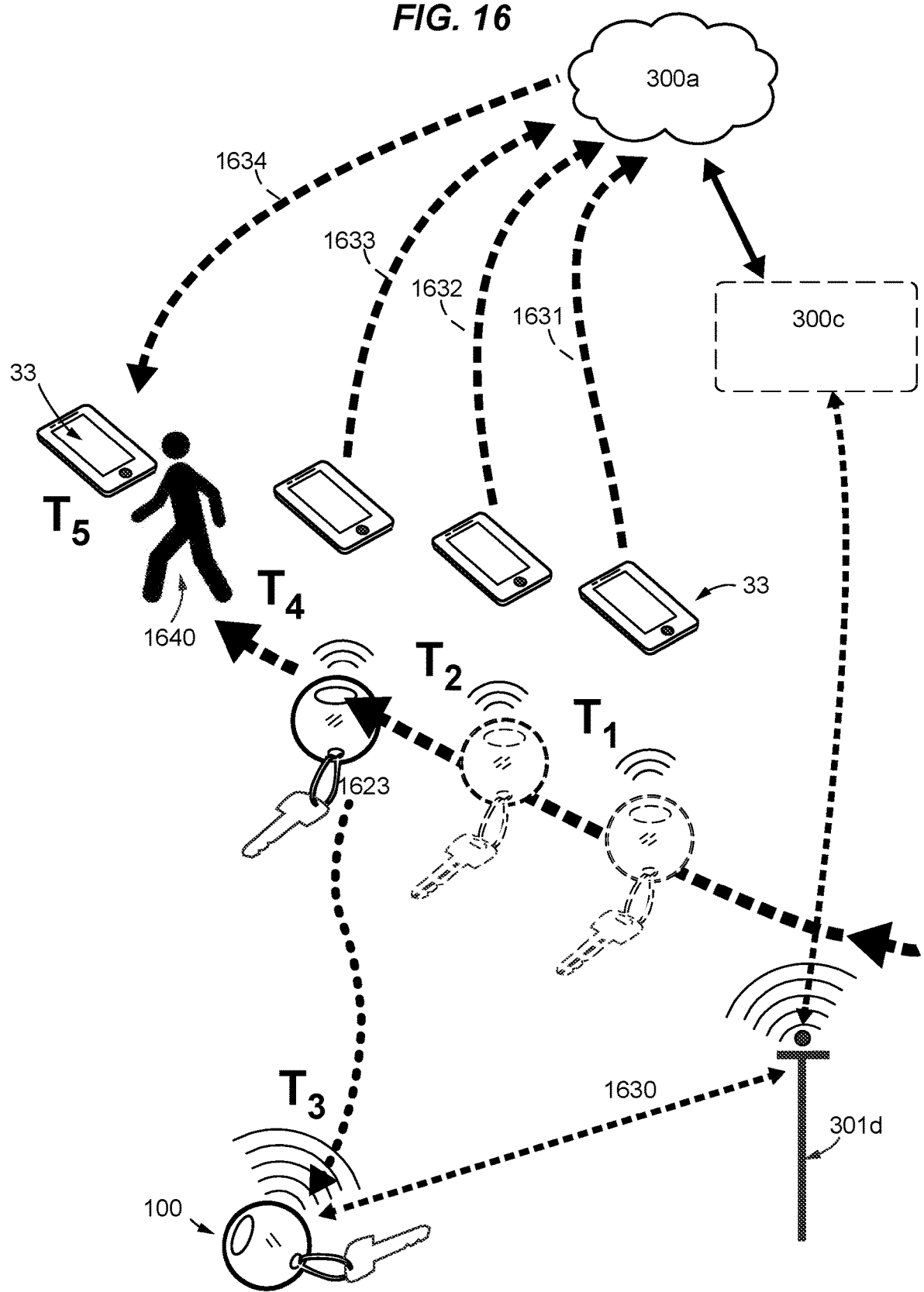
FIG. 16 illustrates a series of events in operating a Bluecell tracking device in combination with a smartphone or other smart device to prevent loss of a keychain.

FIG. 16 is an animated sketch demonstrating use of Bluetooth and cellular radio as a proximity tracker in a hybrid Bluetooth/cellular wireless system. Most such devices use a multi-axis accelerometer to detect movement and velocity of the device, a useful bit of information in understanding what is happening to the device. Is it being moved? Has it fallen still? Answers to these questions can be of great help in knowing where to look for a lost device and systems for generating accompanying alerts and notifications that provide motion sensor data are described for example in U.S. Pat. Nos. 9,564,774, 9,774,410, 9,900,119, 9,961,523, U.S. patent application Ser. No. 15/959,250, having a priority date of 8 Nov. 2015, and US Pat. Publs. 2015/0356862, 20150356858, and 20180190103, wherein all said patents and applications are co-assigned at this filing and are incorporated herein in full by reference.

In the sequence of snapshots of FIG. 16, following action through times $T_1$ through $T_5$, we show another illustration of methods for using the Bluecell system as a tracking device in daily life. In this instance, keychain 100 is paired to an owner's handset 33. As the owner 1640 walks, the companion devices, Bluecell tracker and handset, share regular signals that include motion sensor data. This data is shared with a cloud host 300a in transmissions 1631, 1632, 1633, 1634. At times $T_1$ and $T_2$, all is well, but at time $T_3$ the owner drops 1623 the keychain and even at time $T_4$, still does not realize the device has been lost. However, the Bluetooth cellular hybrid system can detect the drop of the keychain through accelerometer and motion sensor data, and can infer that the owner is walking ahead without it because motion of the radiotag has stopped even though the owner has kept walking. The system flags the spot $T_3$ as the last known location 1623 and recognizing the illogic of the motion sensor data, issues a notification and an alarm on the owner's handset 33 at time $T_5$.

The owner may realize the problem within a few seconds and go back to retrieve the keys, but if not the system continues to intervene. The first thing the system has done is to record the location where the problem became evident and motion of the Bluecell device attached to the keychain was no longer copacetic with the motion of the handset. If the owner becomes so far separated that Bluetooth connectivity is about to be lost, then the device 100, lying on the ground, will wake up the cellular radio and begin broadcasting an alarm 1630 at cell tower 301d to a cloud-based administrative server 300c. When the owner finally realizes he has lost his keys, he will activate a screen on his handset 33 and is guided back to the spot where the keys were lost.

When in radio proximity, the owner can use a smartphone, for example, to activate a speaker or light on the device and then search using his hearing and sight. An application is installed on the smartphone and a user interface is provided that includes icons for the owner's radiotags so that any one of them can be pulled up and renamed or the settings reprogrammed.

Even if someone else picks up the keys and turns them in to the cashier at the nearest business from which the owner would have exited, the system will know that the keys have been moved and via the cellular radio can pinpoint the updated location where the keys are to be found. The owner can activate a beeper on the Bluecell device when close enough to hear the beep and when the audio tone can be heard, can then ask for the keys back from the person behind the counter. So the cellular tracking system is effective over large areas but the Bluetooth Proximity Locator Toolbox is helpful when close enough to hear or see the alarm display.

The administrative server or "cloud host" keeps location data and can help the user/subscriber recover the keys even if lost across town or across the other side of the world. The system will not alarm unnecessarily, such as when the keys are in a save place at home, but can help the user avoid getting locked out of the car.

Similarly, a user/subscriber can program his device to tag the location where he parks his car. A Bluecell device inside the car has stopped moving and the owner has exited the car, data that the accelerometer can recognize as a signature for parking a car. The device sends this data to the companion handset carried by the owner, and a map pin is stored in memory that shows the location and the time the car was parked. It is a simple matter to call up this information if the owner has forgotten where his car is parked. And perhaps of equal value, the Bluecell system can keep track of time on a parking meter, flag a warning when the time is almost up, and perhaps even reach out to an automated metering system operated by a City to add minutes when the owner is unable to tend the meter.

While the premise in FIG. 16 is that the device, when dropped, experiences a shock that actuates the cellular radio system, in other embodiments the cellular radioset can be actuated when accelerometry data fails to show movement. For example, if a companion device such as the owner's handset is reporting movement consistent with walking, but the radiotag has suddenly become stationary, logic in the device is used to make a notification in the host handset that the device has been LEFT BEHIND. Because most handsets are also Bluetooth capable and have accelerometers, the motion of the Bluecell device in absence of motion of the owner's handset triggers a notification (such as a buzzer) on the tracking device. By incorporating cellular radio, the distances at which lost devices are retrievable is increased from tens or hundreds of meters to tens or hundreds of kilometers. For example, a device that has been pilfered may show an unexpected burst of motion, an UNAUTHORIZED MOTION alarm, but mere notification is insufficient to result in its recovery. However, with a cellular connection active, the device can CALL HOME from wherever it ends up, and will provide a location where it can be recovered. In addition, the owner's friends and the community of user/subscribers can also watch for it.

A FIND PHONE application works in reverse, allowing the owner to communicate with a missing smartphone through a Bluecell device. For example, a button switch (106, 214a) can be provided on the Bluecell device, such that when the button is pressed, the resulting radio signal will activate an alarm on the missing smartphone. Alternatively, if a more extended search is needed, the owner can periodically ping the smartphone remotely until a connection is achieved via either a Bluetooth or a cellular radio signal. Once the signal is acquired, instructions can be exchanged to assist in finding the phone. An administrative server may also be used to flag a device as missing, and then a community of users may be recruited to report any radio contacts identifiable by a Bluetooth UUID or a cellular IMSI as belonging to the missing device. The Administrative server logs these contacts and develops a body of radio data that in aggregate allows the owner to zero in on its location.

Figure 17A:
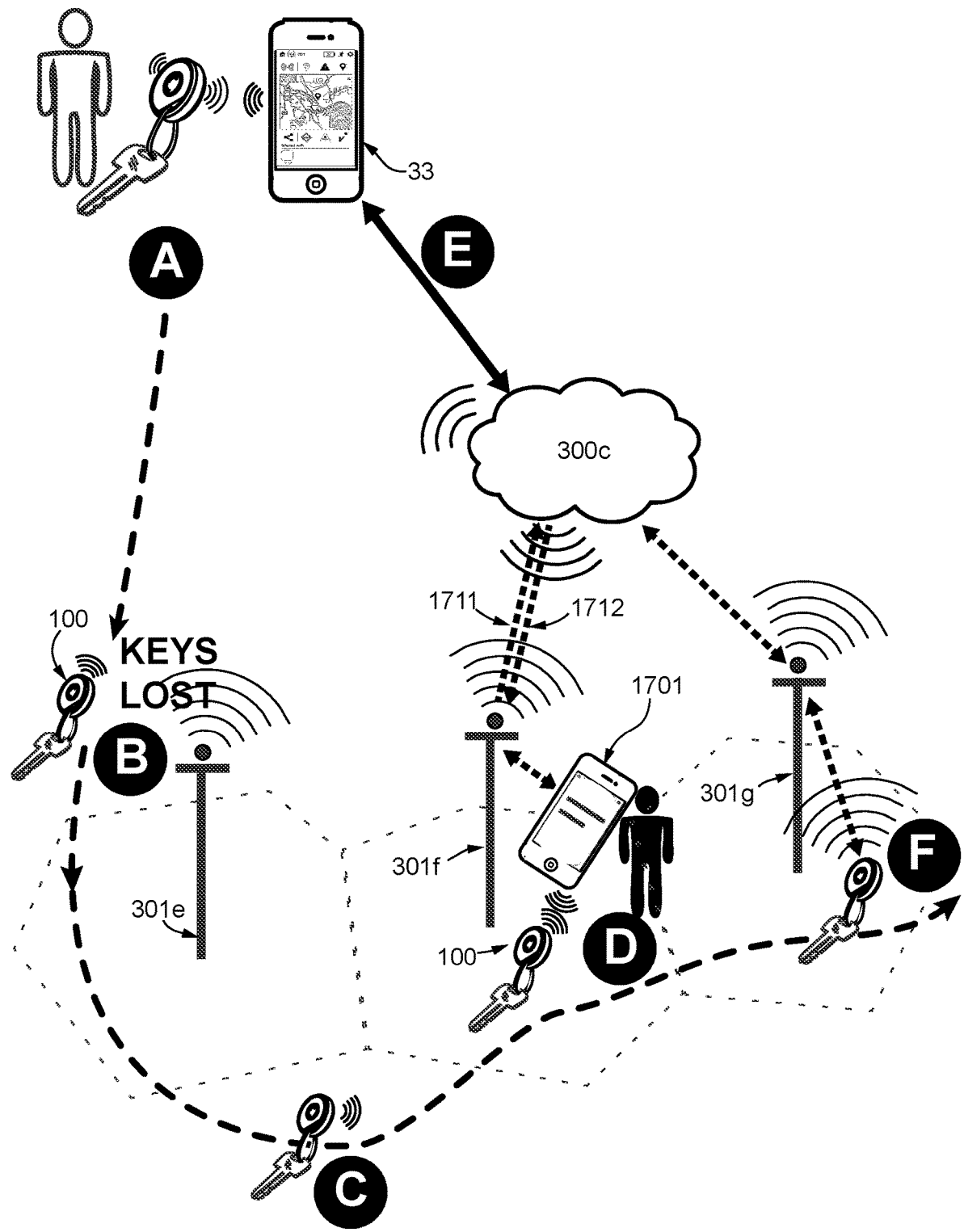
FIGS. 17A and 17B are panels of a composite view showing how the features of the cellular and Bluetooth radios of the Bluecell device can be used to track down and recover a lost item while on the move.
Figure 17B:
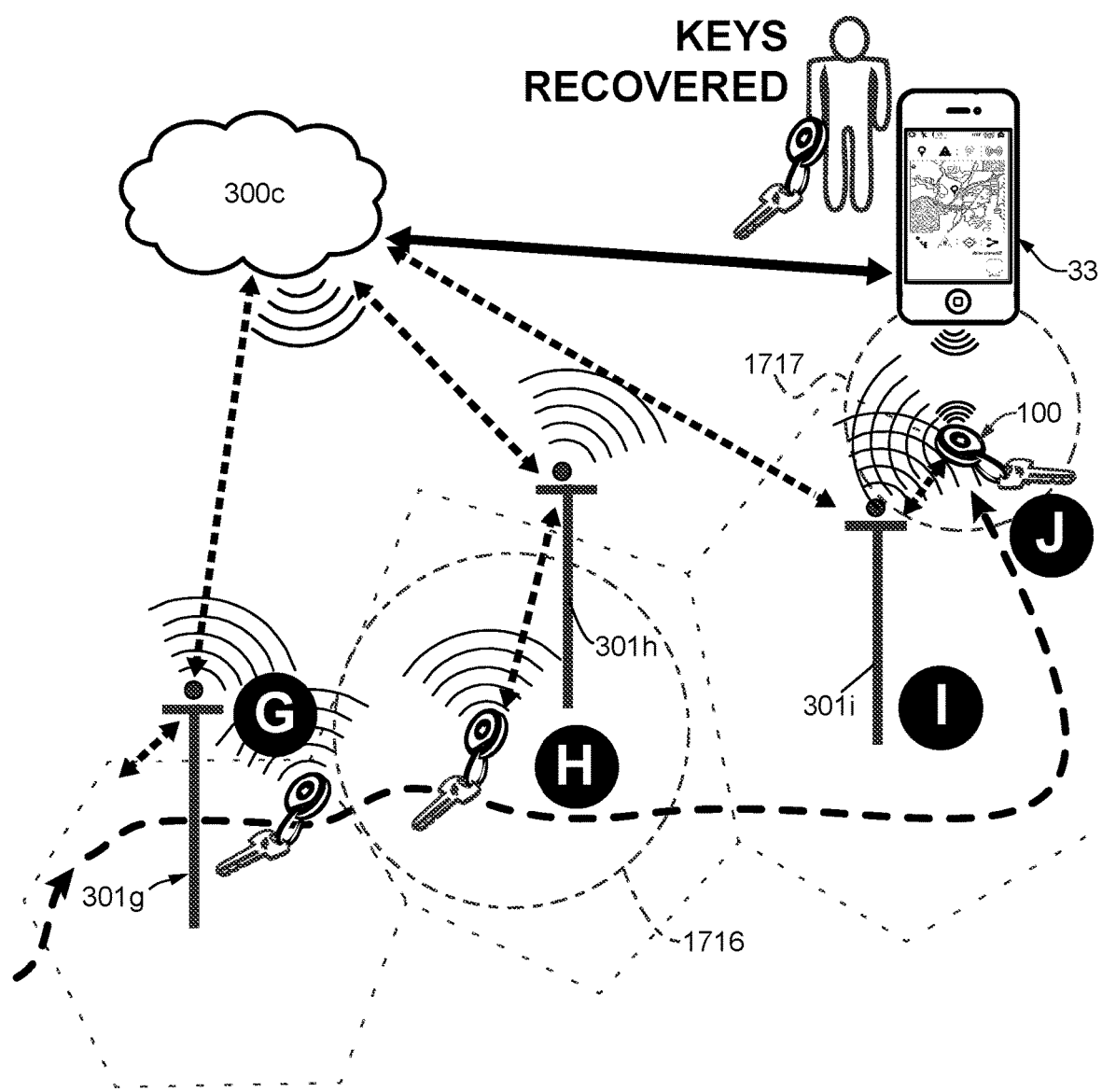

FIGS. 17A and 17B form a duplex panel that illustrates discovery and tracking of a lost keychain and Bluecell radiotag 100 over an extended distance (the distance being large enough that cooperative engagement of both the Bluetooth and the cellular radiosets is required) ending eventually in recovery of the lost item.

Initially, at point A, the owner attaches a keychain to a new Bluecell device, and installs "application" software in a companion smartphone ("handset" 33) so that the Bluecell can be recognized and set up for use. When setting up a new Bluecell device 100, a prudent owner will generally limit radio activity of the cellular radioset to short periods at regular intervals when the device will CALL HOME. In contrast, the Bluetooth radioset is always listening and can respond according to owner permissions as programmed during setup on handset 33.

As a hypothetical, the device 100 and the attached keychain is presumed lost at point B. At this point, the cellular radioset is asleep and the Bluetooth radioset is listening but is out of range of the owner's smartphone. Even as the Bluecell device enters range of 301e, the cellular radioset is not listening in a paging window and cannot be contacted to update its programming.

In this hypothetical, the device is on the move because the keys have been left in a taxi, so both radiosets are likely to have periods where signals are lost. Because the cellular radio is programmed to be on and CALL HOME only at certain intervals set up in eDRX or PSM, if a cell tower is not available at the active time, the call will not go through, such as occurs at point C.

Something interesting happens at point D. A passerby with a compatible smartphone 1701 enters radio proximity to the lost Bluetooth device. A Bluetooth discovery event allows the two radios (100, 1701) to exchange Bluetooth identifiers, and the passerby's smartphone sends (transmission 1711) the discovery information with UUID and timestamp to an Cloud host 300c. Almost instantly, the cloud server 300c sends a command (transmission 1712) to the lost Bluetooth radioset via Cell Tower 301f to wake up, turn ON the cellular radioset and CALL HOME. The cellular radio of the Bluecell device is given the WAKE UP command as relayed through the passerby's radio 1701 to the Bluetooth radioset of device 100 during the brief time in which the two devices 100, 1701 are in radio proximity. The Bluetooth radioset is always listening at low energy and will accept commands, which are then conveyed to the processor of the device. Once the cellular radioset is AWAKE, it can receive direct cellular commands from the cloud host or from its owner. At the same time (point E) the Cloud host 300*c* also notifies the owner and displays a map location of the lost device on the owner's handset 33.

The lost device cellular radio is now ON and is picked up by Cell Tower 301*g*. As instructed by the owner, who can now enter direct cell-to-cell radio messages, the lost device at point F is updating location on a more frequent schedule, or continuously.

By points G and H, Cell Towers 301*h* and 301*i* are receiving and forwarding a series of points, and this continues, so that the owner can receive a trail of "breadcrumbs" tracking the lost device through the series of Cell Towers 301*g*, 301*h* and 301*i*. Dashed circle 1716 indicates a cellular location fix at point H.

Each cell tower reports updated location and timestamp information and the Cloud host updates a map for the user on handset 33 so that the user can estimate an intercept to catch up and collect the lost item. By the time the lost device is at point I, the owner is waiting to intercept it and can flag down the taxicab.

For final tracking at point J, the owner will switch on the Bluetooth Proximity Tracking Tools on the handset 33 which are installed with the Bluecell application. By doing a sweep, an increase signal strength may be detected. When closing in (1717, dashed circle), the owner can send a command from the handset 33 to the Bluecell device 100 to launch an alarm state, causing a buzzer to go off. Even though the item has fallen under the seat in the taxicab, the owner can readily find it. A light may also be illuminated as for under the seat visibility.

More generally, in one embodiment, the methods include receiving the broadcast at a cloud host, the cloud host having an administrative server configured with an instruction set and an administrative database, such that the instruction set including instructions for: i) parsing the broadcast so as to extract the unique identifier(s), sensor payload, and any associated timestamp, proximity measurement, or geotag coded therein; and, ii) then, based on the owner identification, sensor payload, and any contextual information associated therewith, formulating a command or notification, such that the command or notification is based on rules associated with the owner identification in an administrative database and any rules implemented by a system administrator on behalf of a community of members; and finally, transmitting the command or notification over a broad area network to at least one smart device, to a remote machine, to a Bluecell device or Bluetooth device, or to any other actuable device.

More generally, the methods may also include provision for transmitting commands to a remote machine, an actuation device, or a plurality thereof, such that a physical transformation will be achieved, for example opening a garage door, or rolling down a car window, where the owner is not in physical proximity and needs assistance in performing the action. The command to the plurality of remote machines or actuation devices may be a command to execute a machine action or to actuate a device.

The owner typically will preprogram the Bluecell radiotag with a duty cycle for the cellular radio set, setting wake/sleep duration and frequency, and any eDRX and PSM parameters, along with any geofencing and location suppression so as to reduce energy drain and activation of alarm features where none is needed. Alarms for specific geographical limits are set are also preset. Alarms associated with motion patterns are used to further control unwanted activity. These preset features can be reprogrammed remotely; even if the device is lost.

Scheduling cell connectivity conserves power by setting rules that help reduce power loss. The device can be put to sleep for example, when it is safely at home (as known to the system by the proximity of the asset to a "home location" defined and fixed in memory). Or the sleep mode may kick in only at night, and the clock in the device will turn the device off at 10 PM and back on at 6 AM for example. In more complex logic expressions, the Bluetooth core of the tracker device will include a motion sensor 997, and the device will be programmed to trigger an alarm or a notification if the motion of the tracking device is not copacetic with the motion of its paired handset. For example, if the asset has been left at a desk and the owner is headed to the parking lot, then an alarm can be given to remind the owner to go back and get the asset before leaving.

If the radiotagged item is lost, an initial radio proximity search can be done of a local area such as home or an office for the lost device. If not found where expected, then the owner can report the lost device to a cloud administrative server, generally on a web page or user interface accessed through a portable device. Because the radiotag device is identified in the database by nickname, UUID and IMSI of the BT and Cell radio sets, the server has all the information needed to scan incoming reports of radio traffic and flag those reports that include the identifiers associated with the lost device. Because a timestamp and location are often included with the incoming reports, the server can notify the owner and show a map locating the most recent contact or plot a series of contacts to extrapolate its location.

What happens if the radiotag of the lost item is out of range of the Bluetooth cellular radioset? How can a user/subscriber increase the cellular CALL HOME frequency so as to begin tracking the radiotag actively via its cellular radio, not from Bluetooth or cellular radio traffic discovered passively, but by causing the cellular radio to make active and frequent radio reports updating location? A feature of the Bluecell devices makes this possible. The Bluetooth radio is always listening at low power and will detect any compatible radio signals. Whenever a compatible community device detects the UUID of the lost radiotag, the contact is reported to a cloud host. Because item status associated with the UUID identifier is "lost" in a status database, the cloud host will notify the owner and can automatically command the missing device to CALL HOME by sending a Bluetooth connect request data packet with cellular power management protocol override signal. The cloud host will "borrow" time on the community device to send the Bluetooth command to the lost radiotag, using the Bluetooth radioset of the community device as a proxy for the owner. On receipt, the Bluetooth radioset is configured to wake the cellular radio transceiver module and cause the cellular power management protocol to be overridden. Typically the command to CALL HOME is queued for delivery while waiting for any first discovery so that it can be automatically and quickly initiated during any brief Bluetooth contact between the community device and the lost device.

Once the cellular radio is in wake mode, updates to the power savings modes can be sent, such as an update reducing or overriding eDRX mode sleep periods. For example the cellular radio may be instructed to perform location updates on the hour, on the minute, or may be instructed to stay on until further notice. During a cellular wake period, any sleep mode can be modified or overridden by cellular radio command.

If no cell tower-to-device contact is made, then the server will continue to monitor for Bluetooth radio discovery of the missing radiotag. If a cellular radio signal is captured by a cell tower and forwarded to the owner, then cellular locating methods can be initiated and prior sleep mode settings can be overridden by paging the cellular radio IMSI or IP address.

The GUI interface is displayed to the owner along with a notification that the device has been located. The owner can adjust the cellular radio "CALL HOME" contact frequency to get more frequent or continuous updates via the cellular radioset and cell tower network.

If the device is on the move, the administrative server will track locations of all the contacts, storing "breadcrumbs" to map a trail and to extrapolate intercept points. If the device is stationary, a map displaying the closest known point of contact is displayed. Friends may also be notified and asked to assist.

When owner is in Bluetooth proximity to lost radiotag, a notification is displayed and the owner can activate a Bluetooth Proximity Locator (typically the owner's smartphone) to zero in on the missing device. The owner can use the proximity locator tools, including range finding by RSSI, to get closer, and then command the lost device to go into visual or audible alarm state so as to be recovered by owner even if the device is hidden. Otherwise the system will continue to monitor its network for radio hits and advise the owner with periodic updates.

Example I

Figure 18A:
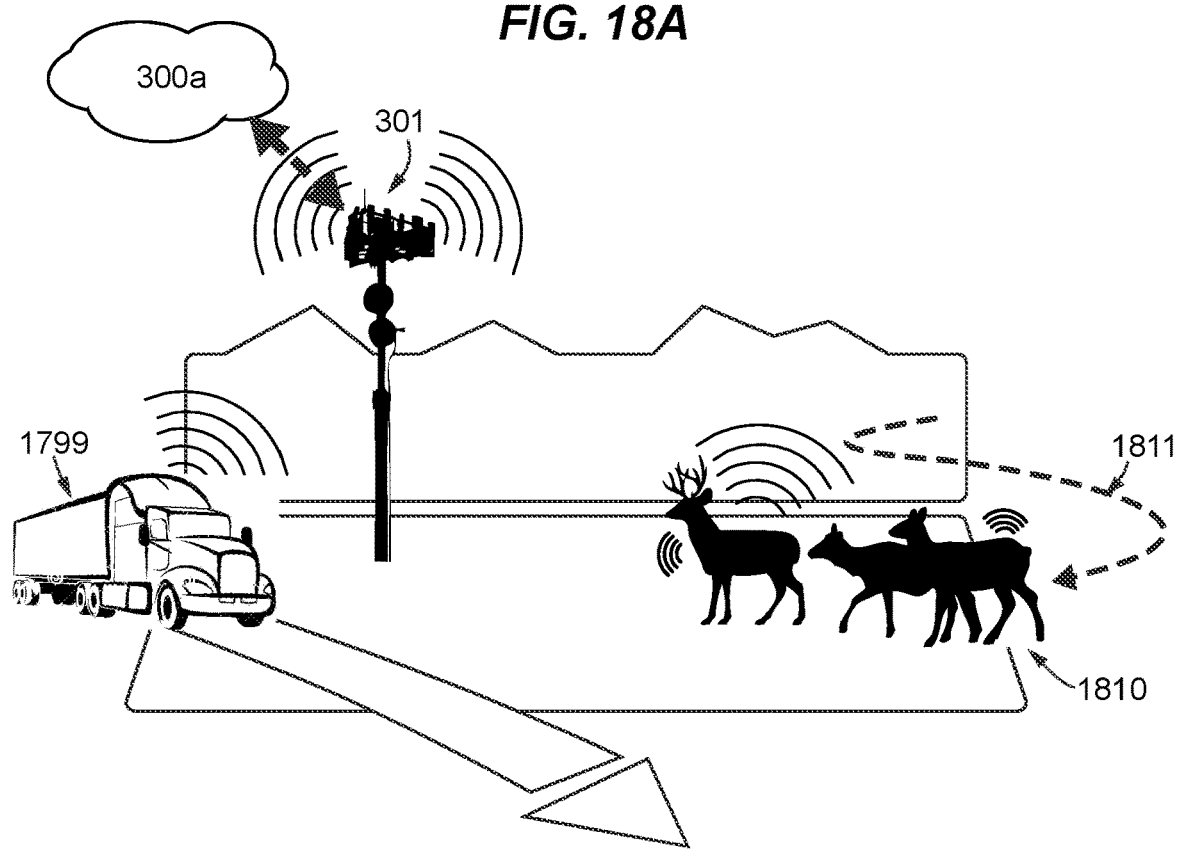
FIGS. 18A, 18B and 18C illustrate the use of an implantable Bluecell device.
Figure 18B:
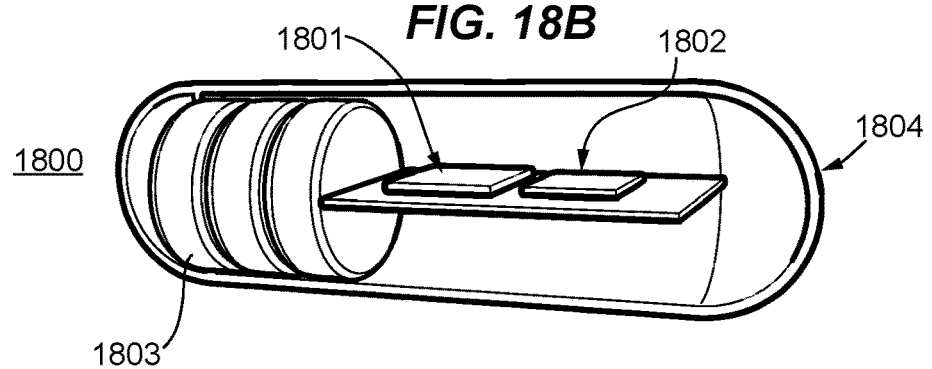
Figure 18C:
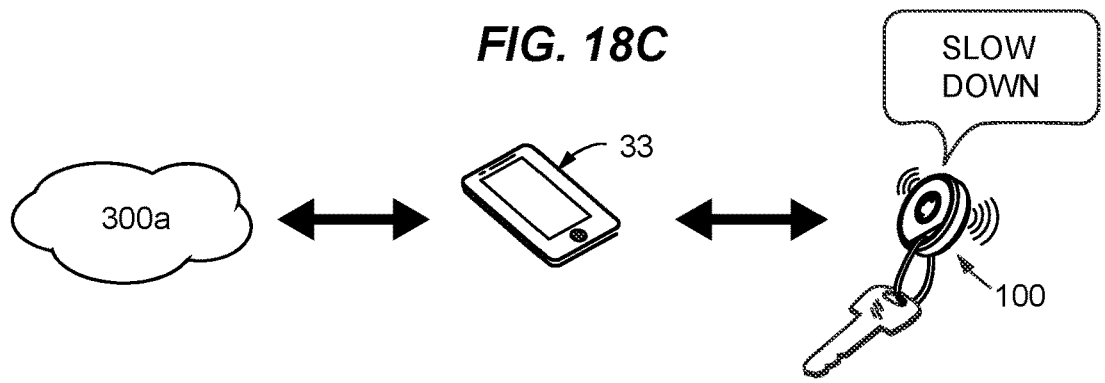

As shown in FIGS. 18A, 18B and 18C, the Bluecell trackers are not limited to human use. Many areas of the world have spotty cellular coverage, but by tagging animals with an implantable Bluecell device 1800, their location, even in rugged terrain, can be captured by citizen scientists, who can download an application, which when installed on a smartphone, detects any tagged elk in proximity and sends the location data, complete with individual animal identification, and sends the data to a National Park research station for further analysis of the migratory patterns 1811. The application enables crowd-sourced biology and can also be installed in drones for aerial surveys of populations.

Persons who are afraid of the animals can avoid them. Where animals and humans interact, the implantable devices can be monitored, either in a cellular cell area or by Bluetooth-to-Bluetooth proximity radio. In this example, a herd of elk 1810 crossing a highway in a rural area are tagged and broadcasting. An approaching truck can receive a warning to slow down 1200 ft from the animals. In one instance, a smartphone 33 with installed application is alerted to the proximity of the animals and causes a second Bluecell device 100 on the driver's keychain to speak, in a synthesized voice, "Slow down, elk crossing!" Bluecell-to-Bluecell radio interactions are implemented by cellular or by Bluetooth radio. A voice interface includes a speaker in the device, and optionally a microphone, essentially as a mobile voice-actuated hub.

And in advanced applications, the devices are equipped with piezo buzzers that alert the animals to look up and take caution. The devices are implanted under the skin of anaesthetized animals in the field, and have a service life of more than a year, allowing scientists to gain a rapid understanding of their range and habits. A temperature sensor sends data that indicates the health of each tagged animal. Similar devices can be used to reduce poaching of elephants in the same way.

A cutaway view of an implantable Bluecell device 1800 is shown in FIG. 18B. Numbered are a microcontroller 1801 with integral Bluetooth radio, a cellular module 1802, and a stack of coin cell batteries 1803 in a sealed polytetrafluoroethylene shell 1804, the interior of which is potted to prevent any leakage. Antennae for both radios are surface mounted on the PCB or are bayonet mounted. An RFID chip may also be included but lacks the range to be of use in the field.

Example II

In another embodiment, the devices include a cellular radioset and a processing circuit with an instruction set in processor memory, as a standalone device having, by configuring power management instructions, a field service life of one year or more.

INCORPORATION BY REFERENCE

All of the U.S. Patents, U.S. Patent application publications, U.S. Patent applications, foreign patents, foreign patent applications and non-patent publications referred to in this specification and related filings are incorporated herein by reference in their entirety for all purposes.

SCOPE OF THE CLAIMS

The disclosure set forth herein of certain exemplary embodiments, including all text, drawings, annotations, and graphs, is sufficient to enable one of ordinary skill in the art to practice the teachings. Various alternatives, modifications and equivalents are possible, as will readily occur to those skilled in the art. The inventions, examples, and embodiments described herein are not limited to particularly exemplified materials, methods, and/or structures and various changes may be made in the size, shape, type, number and arrangement of parts described herein. All embodiments, alternatives, modifications and equivalents may be combined to provide further embodiments of the present invention without departing from the true spirit and scope of the disclosure.

In general, in the following claims, the terms used in the written description should not be construed to limit the claims to specific embodiments described herein for illustration, but should be construed to include all possible embodiments, both specific and generic, along with the full scope of equivalents to which such claims are entitled. Accordingly, the claims are not limited in haec verba by the disclosure.

We claim:

1. A radiotag device having a bluetooth radio with controller, cellular modem, and battery, which comprises instructions that, when executed by the controller, cause the controller:
  (a) in a first network paging window on a cellular network, and in response to a received paging downlink control channel (PDCCH) signal from the cellular network, to cause the cellular modem to send an acknowledgement to the cellular network;
  (b) to cause the cellular modem to default to a low-power state in intervals between the first network paging window and a next network paging window;
  (c) to cause the cellular modem to default to a low-power state when the Bluetooth radio is connected with an owner's smartphone;

(d) in response to a lost cellular network connection, to cause the Bluetooth radio to transmit a beacon message that includes a radio unit identifier of the Bluetooth radio, wherein the beacon message is discoverable by a passerby's smartphone configured to transmit the radio unit identifier to a cloud host; and, (e) in response to a Bluetooth data packet transmitted by a passerby's smartphone, wherein the Bluetooth data packet is addressed to the Bluetooth radio of the device and includes a cloud host-initiated command to the controller, to cause the cellular modem to initiate a cellular network connection with the cloud host and enable cellular network connections to be scheduled at more frequent intervals.

2. The device of claim 1, which comprises instructions to transmit a signal over a cellular network connection to a designated cloud host, wherein in response to the signal, to generate a location report and transmit the location report to the owner's smartphone.

3. The device of claim 1, which comprises instructions to make a CALL HOME.

4. The device of claim 3, which comprises instructions to make a network connection with a dedicated cloud host over a cellular virtual private gateway.

5. The device of claim 3, which comprises instructions to cause the network paging window frequency to be reset in response to a received data packet transmitted as Bluetooth data packet or a cellular data packet.

6. The device of claim 1, which comprises instructions, in response to a Bluetooth data packet received from an owner's smartphone, to cause an alarm state with audible alarm.

7. The device of claim 1, wherein the Bluetooth data packet comprises at least one eDRX override parameter.

8. The device of claim 1, wherein the Bluetooth data packet comprises at least one power savings mode (PSM) override parameter.

9. The device of claim 1, wherein the Bluetooth data packet comprises an instruction to generate a cellular power management protocol override command with at least one tracking area update (TAU) override parameter.

10. The device of claim 1, wherein the cellular modem is configured to accept an instruction contained in a cellular radio message downlink signal, the instruction comprising an eDRX mode parameter of a sleep mode.

11. The device of claim 1, wherein the cellular modem is configured to accept an instruction contained in a cellular radio message downlink signal, the instruction comprising a PSM power savings mode parameter of a sleep mode.

12. The device of claim 1, which comprises a motion sensor.

13. The device of claim 12, wherein the controller is configured to cause a CALL HOME network connection in response to data output from the motion sensor.

14. The device of claim 1, which comprises a global positioning system (GPS) receiver.

15. The device of claim 1, which comprises instructions that enable a report of a current location of the device to be sent to the cloud host over a virtual private gateway.

16. The device of claim 1, which comprises instructions that enable a report of a current location of the device to be sent to the owner's smartphone.

17. The device of claim 1, which comprises instructions that enable location determination by an assisted global positioning system (AGPS).

18. The device of claim 1, which comprises instructions that enable location determination by a positioning-over-LTE service.

19. The device of claim 1, which comprises instructions that enable location determination by a crowd-source location determination.

20. The device of claim 1, which comprises a flash memory configured for storing a radio contact log and for transmitting the radio contact log to a cloud host.

21. The device of claim 1, which comprises a microphone.

22. The device of claim 1, which comprises a speaker or a buzzer.

23. The device of claim 1, wherein the device is implantable.

24. The device of claim 1, wherein the battery is a rechargeable battery.

25. The device of claim 1, wherein the Bluetooth radio has a receive-only mode.

26. The device of claim 1, which comprises a user-accessible signaling button.

27. The device of claim 1, wherein the controller and BT radio are combined as an integrated circuit.

28. The device of claim 1, wherein the controller, BT radio, and cellular modem are combined as an integrated circuit.

29. The device of claim 1, comprising a Bluetooth radio antenna and a multiband cellular radio antenna.

30. The device of claim 1, comprising a GPS radio antenna and GPS receiver.

31. The device of 1, wherein the cellular modem is configured to be compatible with a 5G network.

32. The device of claim 31, wherein the cellular modem is configured to communicate over a 5G network with a virtual private gateway.

33. The device of claim 1, wherein the cellular modem is configured to receive commands from a virtual private gateway when connected to a cellular network.

* * * * *